United States Patent [19]

Silverman et al.

[11] 4,162,488

[45] Jul. 24, 1979

[54] ALARM SYSTEM

[75] Inventors: Howard M. Silverman, Livingston; David G. Barleen, Parsippany; Thomas R. DeLalla, Flanders, all of N.J.

[73] Assignee: Emergency Products Corporation, Parsippany, N.J.

[21] Appl. No.: 776,753

[22] Filed: Mar. 11, 1977

[51] Int. Cl.[2] .......................... G08B 26/00; H04Q/9/00

[52] U.S. Cl. .......................... 340/505; 340/518; 340/152 T; 179/5 R; 340/503

[58] Field of Search .......................... 340/226, 340/408, 152 T, 413, 216, 213.2, 157, 412, 213 R, 164 R, 151, 150, 505, 506, 517, 518, 501, 503; 179/5 R, 2 R, 20 P, 2 A, 2 AM

[56] References Cited

U.S. PATENT DOCUMENTS

| | | | |
|---|---|---|---|
| 3,256,517 | 6/1966 | Saltzberg et al. | 340/408 |
| 3,420,947 | 1/1969 | Kerwin | 340/152 R |
| 3,508,260 | 4/1970 | Stein | 340/408 |
| 3,676,878 | 7/1972 | Linder | 340/408 |
| 3,707,708 | 12/1972 | Dan | 340/409 |
| 3,754,215 | 8/1973 | Blomenkamp | 340/151 |
| 3,815,093 | 6/1974 | Caretto et al. | 340/152 T |
| 3,858,181 | 12/1974 | Goldsby et al. | 340/408 |
| 3,868,640 | 2/1975 | Binnie et al. | 340/151 |
| 3,921,168 | 11/1975 | Dunbar | 340/408 |
| 3,952,285 | 4/1976 | Falck | 340/152 T |
| 4,017,683 | 4/1977 | Pederson et al. | 340/413 |
| 4,023,163 | 5/1977 | Krishmaiyer et al. | 340/409 |
| 4,067,008 | 1/1978 | Sprowls | 340/409 |

*Primary Examiner*—John W. Caldwell, Sr.
*Assistant Examiner*—Donnie L. Crosland
*Attorney, Agent, or Firm*—Lerner, David, Littenberg & Samuel

[57] ABSTRACT

An alarm system is disclosed which utilizes the Bell System DATAPHONE (a registered service mark of AT&T Company) Select-A-Station Service equipment to communicate alarm messages from a plurality of protected premises to a central monitoring station. The system includes a plurality of transponder units, one at each of the protected premises, connected to the central monitoring station through the Bell System equipment. The central monitoring station sequentially polls all the transponders. This is accomplished by sequentially setting up connections from the central monitoring station to the transponder units and sending a START tone burst. In response to receipt of a START tone burst, the connected transponder transmits a tone burst reporting the status of the protected premises. This tone burst contains six tone-pairs in defined time slots, each of the tone-pairs identifying the condition of an associated protected zone, AC power status, and whether the protected premises is in its DAY or NIGHT mode. An alarm condition causes the absence of a tone-pair associated with the particular protected zone. The central monitoring station monitors for the absence of tone-pairs and if two out of three consecutive polls, in their proper turn, of the transponder at a particular protected premises reveal the persistence of an alarm condition, operating personnel at the central monitoring station are alerted so that the proper authorities may in turn be notified. When a DAY to NIGHT transition is requested by a customer at a protected premises, the central monitoring station transmits a RINGBACK tone burst, which is the same frequency signal as utilized for the START tone burst, except that it occurs during a different time interval of the scan time. The central monitoring station includes a memory for storing the status of each of the protected premises, a display, a printer, and associated control circuitry.

28 Claims, 15 Drawing Figures

ALARM SYSTEM

BACKGROUND OF THE INVENTION

This invention relates to alarm systems and, more particularly, to an alarm system wherein a central monitoring station is sequentially connected to poll a plurality of remote transponder units, each located at a respective protected premises.

There are presently in existence many different types of alarm systems for monitoring selected conditions at a protected premises and providing an alarm indication upon detection of an abnormality in the selected condition. For example, conditions which are typically monitored are the presence of a fire, the opening of a door or window which should be in a closed state, a holdup attempt as signaled by the pushing of a "panic" button, etc. Such alarm systems range from the relatively simple to the very elaborate and sophisticated.

A simple alarm system would utilize sensor elements, such as fire detectors, which, when actuated, would cause the sounding of an audible device such as a loud beeper or horn on the protected premises. Such a system functions solely as a local warning that an abnormal condition has occurred, and no one off the protected premises is aware of such. In the event that an abnormal condition occurs while no one is on the premises, such as a fire or break-in during the night, it would be desirable to provide an indication of such to persons who will take action in response thereto, i.e. the local fire department or police department.

Different systems have been developed to accomplish the foregoing objective. For example, one way of accomplishing the objective is to have apparatus which is responsive to an abnormal condition for dialing and setting up a telephone connection between the apparatus at the protected premises and a preselected telephone at for example the local fire department or police department, the apparatus including a prerecorded message which is repeated a predetermined number of times after the telephone connection is established. Such a system has a number of disadvantages and thus is not entirely satisfactory. For example, the described system can be rendered inoperative by disconnecting the power or telephone line. In either event, a message cannot leave the protected premises.

A system which is in widespread use and obviates the above disadvantages includes a central monitoring station having dedicated wires connected between the central monitoring station and all the different protected premises. At the protected premises, the various conditions sensors are connected to the dedicated wires so that when all conditions are normal, a closed loop is formed between the central monitoring station and the protected premises over the dedicated pair of wires. When a sensed condition is abnormal, the loop is opened by the particular sensor. The central monitoring station is responsive to the opening of the loop to provide an alarm indication at the central monitoring station. If power is lost at the protected premises or if the wires are cut, this will open the loop and provide an alarm indication at the central monitoring station. Although this system is an improvement over the local alarm system, it also suffers from several disadvantages. In particular, a burglar can short the loop and prevent any alarm indication from being given. Also, using only a single pair of wires in the manner described, it is not possible to distinguish the type of abnormal condition.

In order to overcome these disadvantages, various other more sophisticated and elaborate systems have been devised. For example, U.S. Pat. No. 3,256,517 discloses a system wherein a plurality of remote stations are all connected to a single central station. The central station transmits a combination of tones to all the remote stations. Each remote station is responsive to a unique predetermined tone combination so that the central station can selectively address a desired remote station. The remote station responds only to the combination of tones comprising its address to retransmit to the central station the same group of tones if none of the alarms at the remote station have been actuated. If the alarm function corresponding to a particular tone of the address group has been actuated, this tone is shifted in frequency, and the shifted tone is retransmitted as part of the tone group in place of the normal tone of that group. The central station is thus made aware that an alarm condition has occurred and further which alarm condition has occurred. A particular disadvantage of this system is that it requires dedicated wires between the central monitoring station and all the different remote stations.

U.S. Pat. No. 3,209,342 discloses a system wherein, upon the occurrence of an alarm condition at a remote station, a first frequency signal is sent to a central station. The central station then sends an interrogation signal to the remote station. A further frequency signal is then transmitted from the remote station to the central station to indicate the particular alarm. This system also requires dedicated wires from the central station to the different remote stations. Furthermore, as this system requires the remote station to initiate action, it is subject to tampering.

U.S. Pat. No. 3,725,865 discloses a system including a central station and a large number of remotely located stations. The central station contains a plurality of receivers, each corresponding to a different remote station and each tuned to the frequency of the associated remote station. When there is an alarm condition at a remote station, a signal of the assigned frequency is transmitted to the central station. This system suffers from the same disadvantages as the last-described system.

It is therefore an object of this invention to provide an alarm system wherein a central monitoring station monitors alarm conditions at a plurality of remote stations, each located at a respective protected premises.

It is a further object of this invention to provide such an alarm system wherein, when an alarm condition occurs, the central monitoring station can detect the type of alarm condition.

It is another object of this invention to provide such an alarm system wherein the absence of a signal indicates an alarm condition so that tamper protection is provided.

Many types of protected premises require different condition sensing dependent upon whether the particular premises is in an occupied or unoccupied state. For example, during the time when the premises is occupied (during the day) certain doors such as the front door are repeatedly opened and closed. During unoccupied times, these doors should remain closed. For practical purposes, the door condition sensor should remain in place at all times, but the sensing of the door opened condition should only cause an alarm to be generated during certain time periods. It would therefore be desirable to provide means for conditioning the remote station to inhibit the sensing of certain conditions during certain times. This means could include a switch which may be selectively placed in the DAY position during occupied times of the premises and in the NIGHT position during unoccupied times. The first person to enter the premises could then move the switch from the NIGHT position to the DAY position and the last person to leave the premises could move the switch from the DAY position to the NIGHT position. However, if an alarm condition exists, such as a door or window being ajar, it would be desirable to prevent the last person from leaving the premises until that condition is corrected.

It is therefore yet another object of this invention to provide an alarm system as described wherein means are provided to condition the system to respond to certain alarms only during certain times.

It is still another object of this invention to provide such an alarm system which may be manually transferred from a day monitoring condition to a night monitoring condition and wherein when such transfer is attempted, the person attempting such transfer is notified if an alarm condition exists so that such person may correct such condition.

Typically, the dedicated wires between the central station and the associated remote station are leased from the local telephone company. The cost of such dedicated leased lines is a major cost of the alarm system, and such cost is expected to increase dramatically. The Bell System is currently introducing DATAPHONE (a registered service mark of AT & T Company) Select-A-Station Service which is a private line data service designed for applications in which a master station exchanges voiceband data information with a number of remote stations, one at a time. Point-to-point voiceband connections are set up between the master station and each remote station to allow this exchange of information. The service allows two-way transmission between the master station and the remote station, but no direct transmission is available between remote stations. Connection control can be achieved only from the master station. The security of this service makes it particularly well suited for alarm central station applications. In particular, the fact that connection control can come only from the master station and the fact that all remote stations other than the one connected at a particular time are isolated from the connected path and from each other ensures that no trouble on one remote leg can affect proper cooperation of the remainder of the circuit. This isolation of each point-to-point connection also ensures the privacy of communication between the master station and each remote station.

It is therefore an additional object of this invention to provide an alarm system as described which is compatible with the above-described Bell System Select-A-Station Service.

Any alarm system compatible with the Bell System Select-A-Station Service must be capable of polling the remote stations at spaced intervals to ensure that no alarm condition goes undetected for more than a minimal time.

It is therefore still another object of this invention to provide such an alarm system as described wherein the central monitoring station sequentially and repetitively polls the plurality of remote stations.

SUMMARY OF THE INVENTION

The foregoing and additional objects are attained in accordance with the principles of this invention by providing an alarm system which includes a central monitoring station and a plurality of remote transponder units, the latter being located each at a respective protected premises. The central monitoring station and the remote transponder units are interconnected via the Bell System Select-A-Station Service equipment. The central monitoring station provides signals at predetermined intervals to cause the Bell System equipment to sequentially connect the central monitoring station to the plurality of remote transponder units at the different protected premises. Circuitry in the central monitoring station transmits a START signal to the connected remote unit. The START signal comprises a fixed frequency tone. Circuitry in the remote transponder station responds to detection of the START signal and transmits a plurality of tone-pairs, each corresponding to a respective normal condition at the protected premises. An abnormal condition at the protected premise inhibits the transmission of the associated tone-pair. The central monitoring station contains circuitry responsive to the absence of a tone-pair for recognizing an alarm condition. Further circuitry within the central monitoring station delays action on an alarm condition until at least two out of three transmissions from a remote transponder indicate the persistence of the alarm condition. The central monitoring station includes a printer and visual display unit for selectively printing and displaying the status of selected, or all, protected premises. Furthermore, when an alarm condition is detected, such condition is automatically printed. Each remote transponder unit includes a switch which may manually be placed in either a DAY or NIGHT position. When the switch is in the DAY position, the reporting of certain predetermined alarm conditions is inhibited, for example, the state of the front door. When the switch is moved from the DAY to the NIGHT position and no alarm conditions exist, the central monitoring station acknowledges receipt of this transition by transmitting a RINGBACK tone burst. Receipt of this RINGBACK tone burst by the remote transponder unit causes a light on the transponder unit to be lit (or alternatively an audible signal may be given) so that the person who operated the switch knows that no alarm conditions exist and that person may then leave the premises. More importantly, the person knows that the communication link to the central monitoring station is intact. However, in the event an alarm condition exists when the switch is moved from the DAY to the NIGHT position, the transponder unit does not signal the central monitoring station of the transition and so no RINGBACK tone burst is received by the transponder unit. The person who moved the switch is thereby notified that an alarm condition exists and that person should then rectify the condition before leaving the premises. Each remote transponder unit further includes a plurality of lights for displaying the status of monitored conditions.

DESCRIPTION OF THE DRAWING

The foregoing will be more readily apparent upon reading the following description in conjunction with the drawing wherein.

SYSTEM DESCRIPTION

Figure 1:
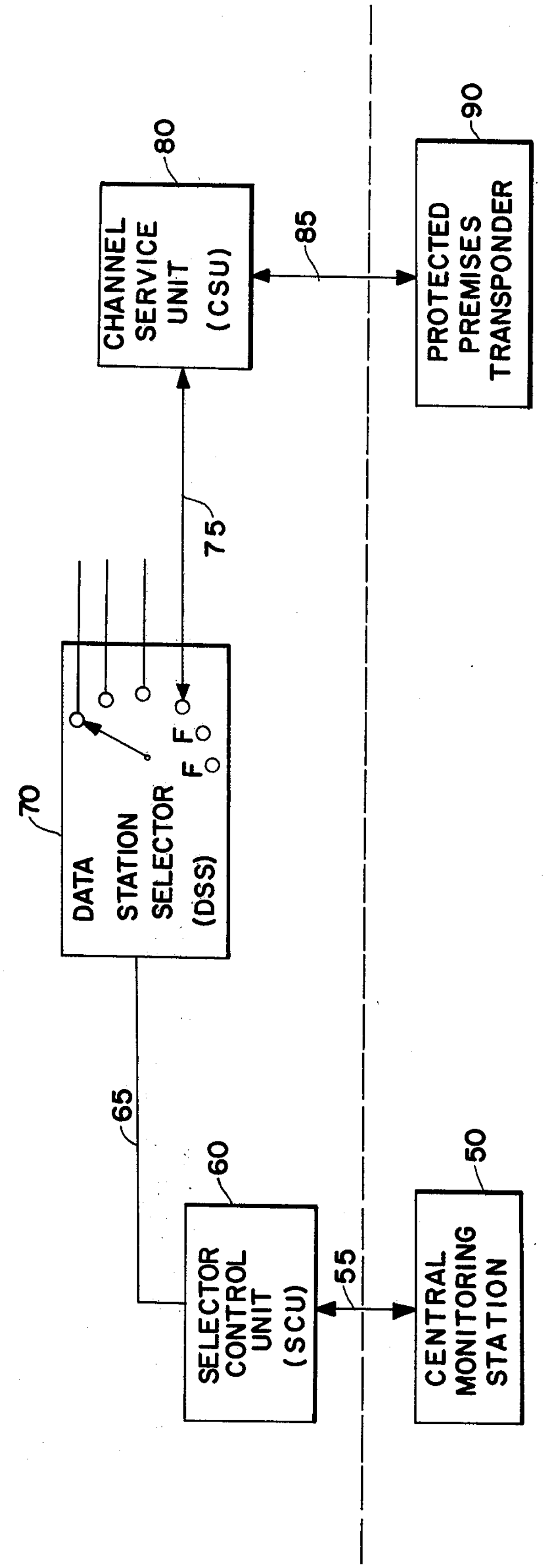
FIG. 1 depicts an over-all block diagram of an alarm system constructed in accordance with the principles of this invention.

Referring now to FIG. 1, depicted therein is an overall block diagram of an alarm system constructed in accordance with the principles of this invention. The system comprises five different components, two of which are duplicated for every protected premises and the other three of which are each singularly provided. As shown in FIG. 1, the alarm system, according to this invention, comprises a central monitoring station 50 connected to a Selector Control Unit (SCU) 60. SCU 60 in turn is connected to a primary port of Data Station Selector (DSS) 70. A plurality of secondary ports of DSS 70 are connected to a plurality of Channel Service Units (CSU) 80, only one of which is shown. CSU 80 is connected to a protected premises transponder 90. SCU 60, DSS70 and CSU 80, the elements of the system above the dashed line in FIG. 1, are Bell System supplied equipment which provide the above-described Select-A-Station service. This service is described in detail in Bell System Transmission Engineering Technical Reference, "Data Communications Using DATA-PHONE Select-A-Station Service"—June, 1976, PUB 41014, published by the American Telephone and Telegraph Company, and only as much detail as is deemed necessary for an understanding of this invention will be given herein.

Each protected premises has a transponder 90 and CSU 80 associated therewith and located thereat. CSU 80 and transponder 90 are connected by a voiceband line pair 85. The connection between DSS 70, which is at the local telephone company central office, and CSU 80 is by means of voiceband line pair 75. The alarm system described herein is adapted to be utilized with a central office location manned by personnel and at which central office location is installed central monitoring station 50. SCU 60 is also installed at this central office location. Central monitoring station 50 is connected to SCU 60 by cable 55. Cable 55 comprises a four-wire voiceband interface and DC control leads, as will be described in more detail hereinafter. SCU 60 is connected to DSS 70 at the local telephone company central office by four wire voiceband channel 65.

DSS 70 is functionally an electronic switch which, on command, sets up a connection between its primary port and one of its secondary ports. In accordance with the principles of this invention, DSS 70 is operated in its controlled step sequential mode. However, it is understood that other modes of operation of DSS 70 are possible without departing from the spirit and scope of this invention. In the controlled step sequential mode, DSS 70 will make a connection between SCU 60 at the primary port and the next secondary port (corresponding to a CSU 80) in its fixed sequence only upon reception of a control signal from central monitoring station 50. The required control signal is a 10 millisecond DC pulse. DSS 70 can be selectively set to cycle through any multiple of eight secondary ports up to a maximum of 128 secondary ports. In addition, two frame ports (reference designation F within the block representing DSS 70 in FIG. 1) are provided. Thus, the system depicted in FIG. 1 can be utilized to monitor conditions at a total of 128 remote protected premises. It is apparent, however, that if desired, additional protected premises can be monitored by adding additional equipment.

In accordance with the principles of this invention, and in the illustrative embodiment described herein, central monitoring station 50 allocates a 222 millisecond time slot for connection to each transponder 90. Of this 222 millisecond time slot, the first 10 milliseconds is dedicated to the DC pulse transmitted to cause DSS 70 to step to its next connection. At the end of this 10 millisecond time period, central monitoring station 50 transmits a 34.4 millisecond START tone of 2250 hertz. The transponder 90 to which the connection is made receives this START tone which enables that transponder 90 to transmit to central monitoring station 50 a toneburst which identifies the condition status of its associated protected premises. This toneburst contains six tone-pairs which identify the status of the conditions monitored at the protected premises, as will be described in full detail hereinafter. Each of the six tone-pairs occupies a time slot of 22.2 milliseconds, for a total time of 133.2 milliseconds which is allocated for transmission of the tone-pairs. An alarm condition at the protected premises causes the absence of the tone-pair associated with that condition. A time period of 44.4 milliseconds remains of the initial 222 millisecond time slot. The first ten milliseconds of that remaining time period is not used. In the event that a transition from day to night operation at the protected premises is sensed by central monitoring station 50, a RINGBACK signal is transmitted from central monitoring station 50 to transponder 90 during the last 34.4 milliseconds of the 222 millisecond time slot. Advantageously, the RINGBACK signal is a tone of 2250 hertz, the same frequency as the START signal. This allows for efficient utilization of circuitry in both the central monitoring station 50 and transponder 90.

After central monitoring station 50 has completed its 222 millisecond look at a port, it will automatically command DSS 70 to step to the next port. The ports are arranged in groups of eight at DSS 70. Up to sixteen groups of eight ports (128 in total) may be connected into the system. Central monitoring station 50, illustratively by means of binary-coded switches, is told how many groups are wired into DSS 70. If it were a 32 port system, for example, at the end of 32 connections, central monitoring station 50 will wait for a "frame" signal from DSS 70. When this frame signal is received by central monitoring station 50, it waits for two connection times (each being 222 milliseconds) and at the end of this time, central monitoring station 50 resets its internal address counter and is connected to port No. 1. It thus takes approximately 29 seconds (130 ports at 222 milliseconds/port) to completely scan through a 128 port system.

If central monitoring station 50 does not receive the frame signal, it goes into an alarm condition and notes that a DSS 70 failure has occurred. Upon receipt of the frame signal, central monitoring station 50 will resume polling. Any alarm condition that may have occurred at a remote protected premises between successive polls of the associated transponder unit will have been latched into a memory at the transponder unit, and an indication of the alarm condition will be transmitted to the central monitoring station 50 the next time that that transponder unit is connected. For central monitoring station 50 to record a valid alarm condition, it must recognize two out of three occurrences of an alarm condition transmission, and it can take up to three "looks" to accomplish this. On a momentary open and close of a door, for example, even though the alarm condition at the door is reset, the transponder unit is still latched in alarm. The transponder is then only reset after three "looks" from the monitor, determined at the transponder by the presence of three START tone receptions. This feature in the transponder unit also allows storage of alarms in the event of a telephone line or other equipment failure in the communication link.

The foregoing will be more completely described by the following detailed descriptions of the transponder unit 90 and the central monitoring station 50.

DESCRIPTION OF TRANSPONDER UNIT

Figure 2A:
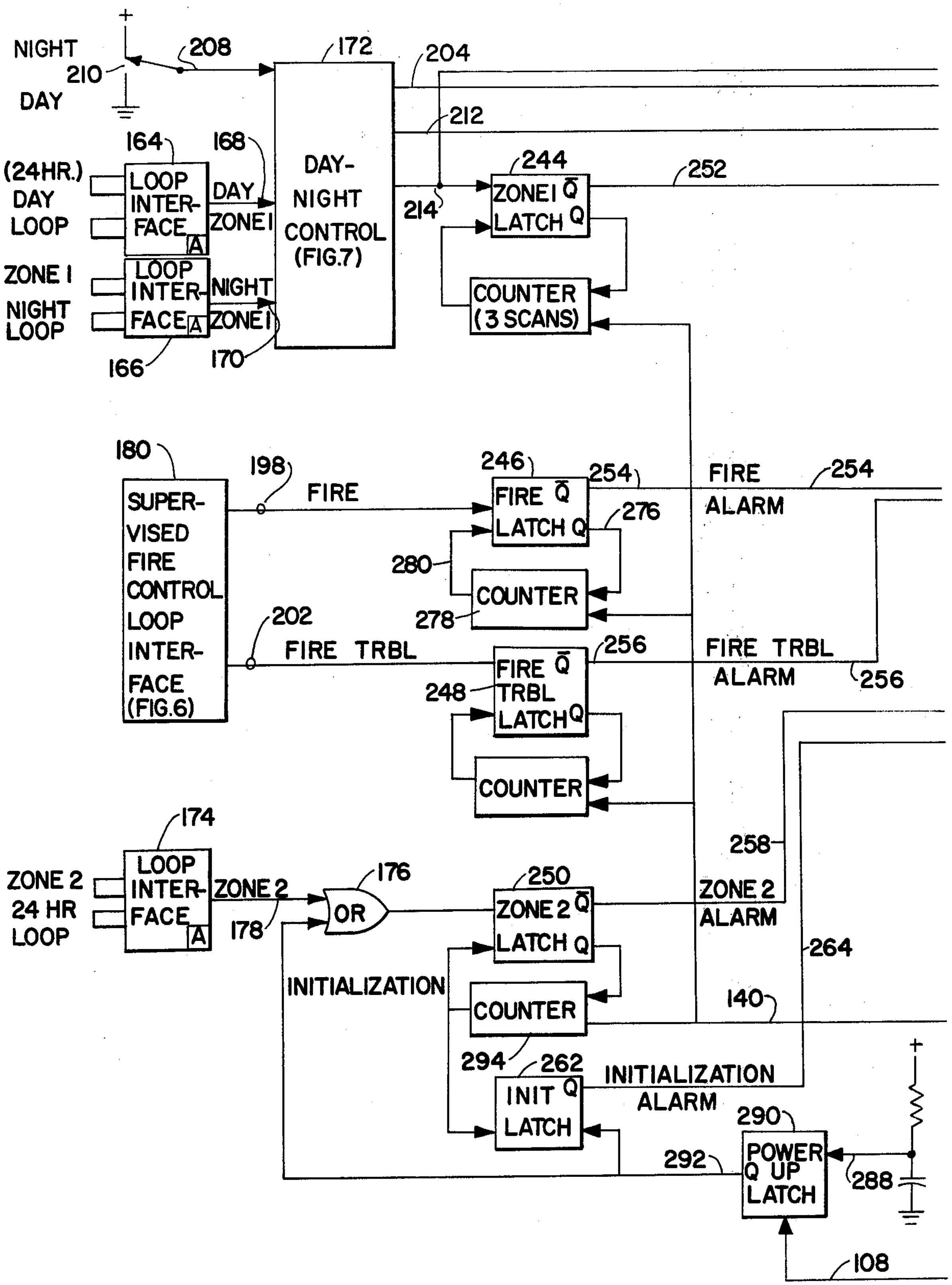
FIGS. 2A and 2B, with FIG. 2A placed to the left of FIG. 2B, is a block schematic diagram of the transponder unit located at the remote protected premises.
Figure 2B:
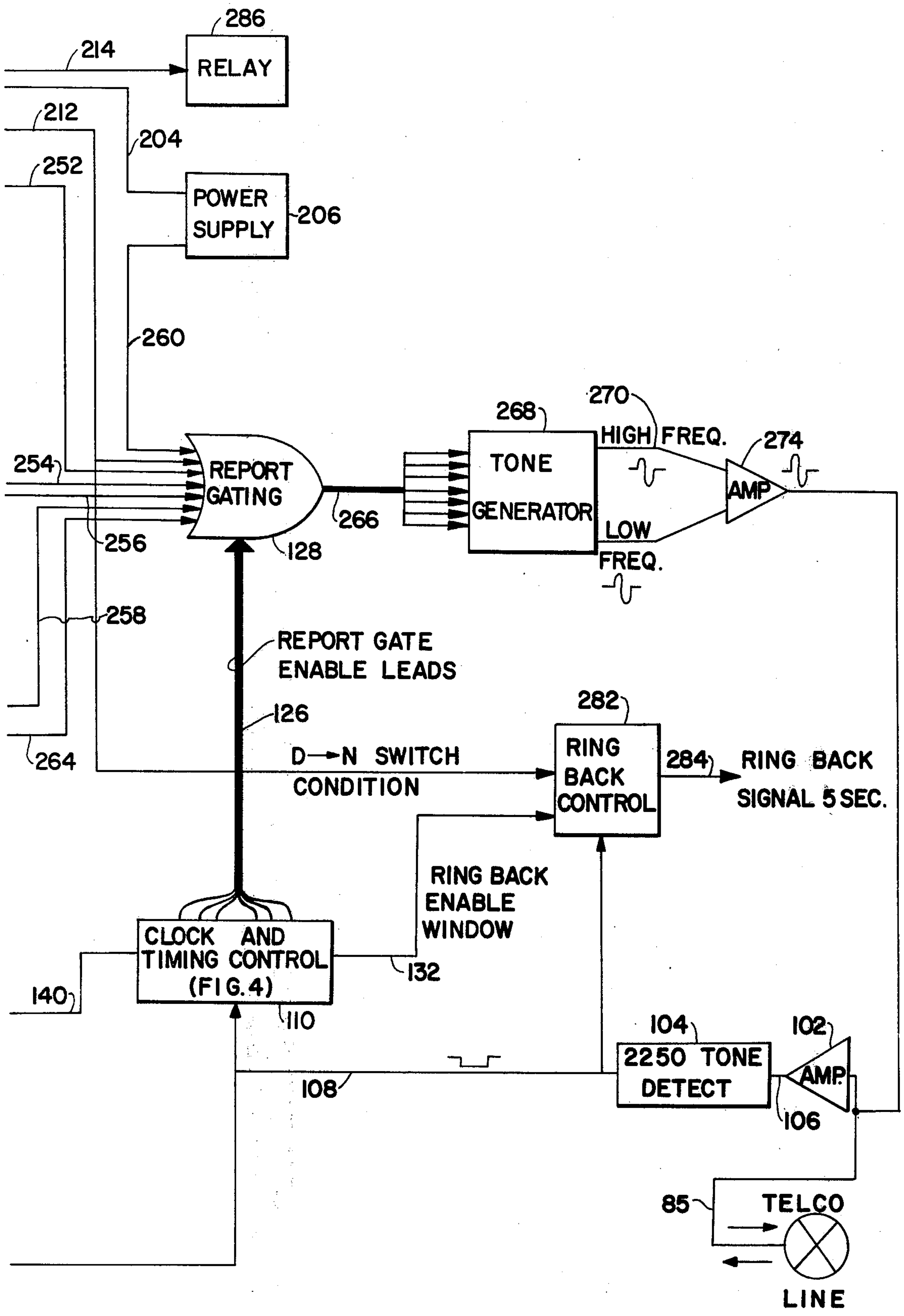

Referring now to FIGS. 2A and 2B, shown therein is a block schematic diagram for transponder 90. All transponder units 90 in the different protected premises are identical. Central monitoring station 50 knows which transponder unit is transmitting an alarm condition by knowing to which transponder unit it is connected through DSS 70. However, the different transponder units 90 may have different condition sensors wired into its zone loops, as will be explained in the following discussion.

As shown in FIGS. 2A and 2B, transponder unit 90 is connected to line-pair 85, a standard voiceband telephone line. Transponder 90 both transmits and receives over line-pair 85. The only signals that transponder unit 90 receives from central monitoring station 50 over line-pair 85 are the START and RINGBACK signals. Both of these signals comprise 2250 hertz tones. Signals received over line-pair 85 pass through amplifier 102 and 2250 hertz tone detector 104. Detector 104 is illustratively a type XR-2211 FSK demodulator/tone decoder manufactured by Exar Integrated Systems, Inc. of Sunnyvale, California, connected for tohe detection of 2250 hertz. When a signal of frequency 2250 hertz appears on line 106, the output of detector 104 on line 108 goes low for as long as the 2250 hertz signal appears on line 106. As shown by the timing chart of FIG. 3, the signal on line 108 persists for 34.4 milliseconds. This pulse enables clock and timing control circuit 110 to initiate the timing function for the transponder unit starting at the trailing, or positive going, edge of the pulse on line 108. A more detailed schematic of clock and timing control circuit 110 is shown in FIG. 4.

Figure 3:
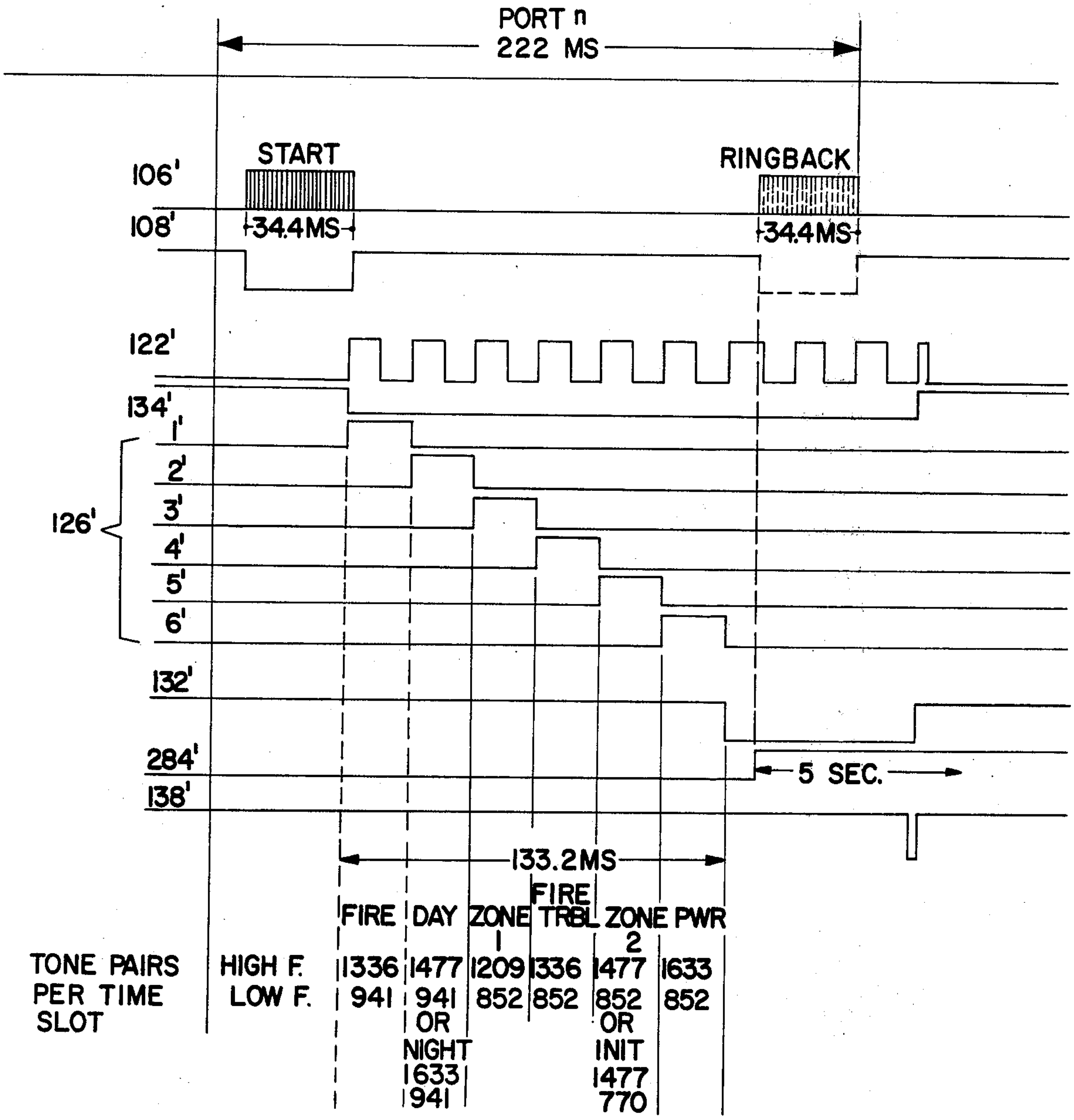
FIG. 3 depicts a timing chart helpful in explaining the operation of the transponder unit.
Figure 4:
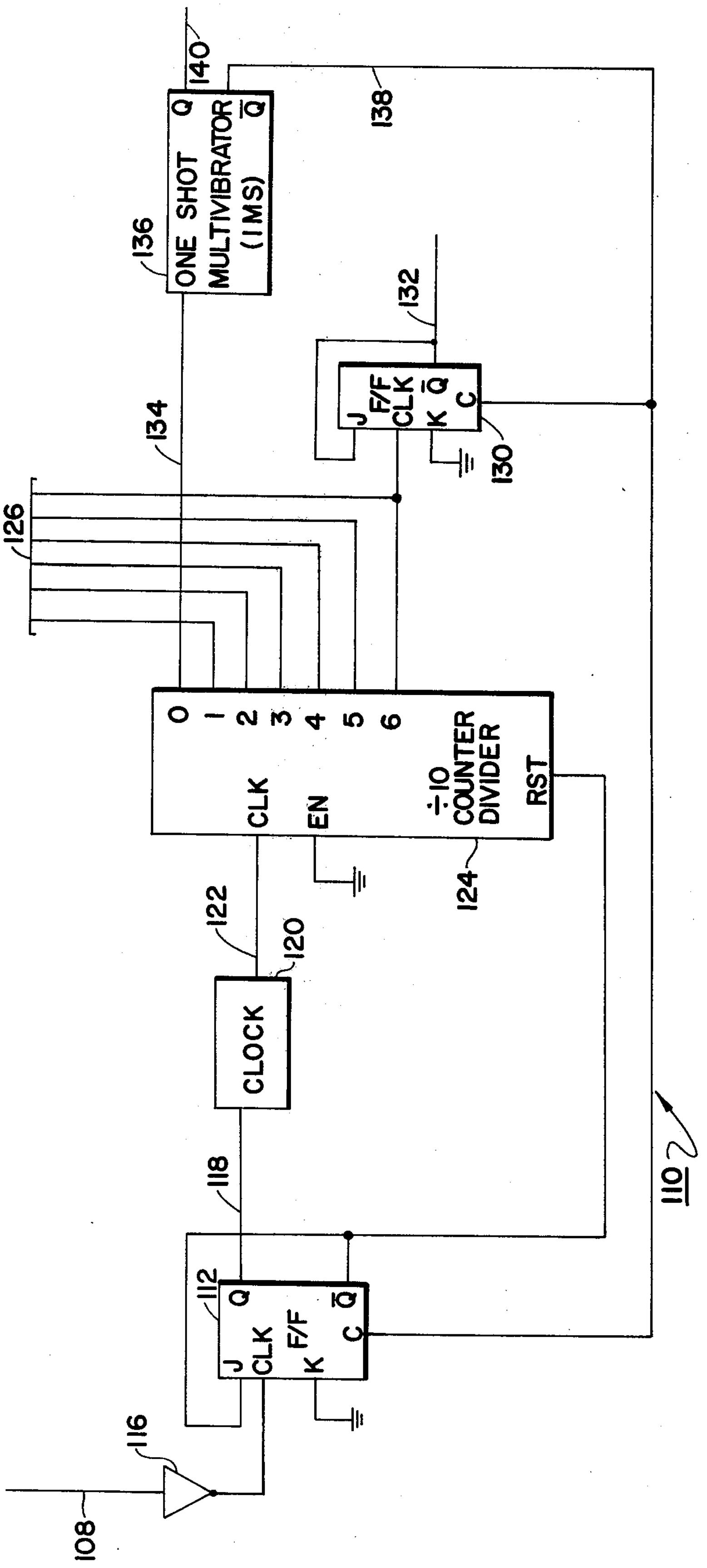
FIG. 4 shows a block diagram of the clock and timing control circuit of the transponder unit.

As depicted in FIG. 4, clock and timing control circuit 110 includes a J-K flip-flop whose CLK input on lead 114 is coupled to receive the output pulse from detector 104 on lead 108 through inverter 116. The trailing edge of the output pulse from detector 104 triggers flip-flop 112 to put a high signal on lead 118, thereby enabling clock circuit 120. Clock circuit 120 illustratively comprises a type 555 integrated circuit connected as a free-running astable multivibrator to provide at its output on lead 122 a square wave signal of period 22.2 milliseconds when a high signal is applied to input lead 118. The square wave clock output on lead 122 is applied to divide by 10 counter/divider 124 which is illustratively a type 4017 divide by 10 counter/divider integrated circuit. (Both the type 555 and type 4017 integrated circuits are manufactured by National Semiconductor). The outputs designated 1–6 of counter/divider 124 are utilized to define the six time slots for transmission of the six tone-pairs from transponder 90 to central monitoring station 50. These outputs are transmitted via lines 126 (the report gate enable leads) to report gating circuit 128, to be described in more detail hereinafter. This timing is shown in FIG. 3 where the prime designations for the signals correspond to the reference numerals of the corresponding leads upon which the signals appear.

The "6" output of counter/divider circuit 124 is also connected to the CLK input of J-K flip-flop 130. The $\overline{Q}$ output of flip-flop 130 on lead 132 is utilized to define the RINGBACK enable window, during which time transponder 90 is conditioned to sense the RINGBACK tone transmitted by central monitoring station 50 when a valid day to night transition occurs at the location of transponder 90. This operation will be described in more detail hereinafter.

After counter/divider circuit 124 completes a full ten count cycle, the "0" output of circuit 124 on lead 134 causes one-shot multivibrator circuit 136 to provide a 1 millisecond negative going pulse at its $\overline{Q}$ output on lead 138. Illustratively, multivibrator 136 is a type 221 integrated circuit. The negative going pulse on lead 138 occurs approximately 66.6 milliseconds after the "6" output from counter/divider circuit 124. This pulse on lead 138 resets flip-flop 130 thereby terminating the RINGBACK window signal on lead 132. The pulse on lead 138 also resets flip-flop 112, thereby disabling clock 120. The resetting of flip-flop 112 also resets counter/divider circuit 124. Simultaneously with the appearance of a negative going pulse on lead 138, one-shot multivibrator circuit 136 also provides a positive going one millisecond pulse on lead 140. The pulse on lead 140 is utilized as a reset pulse for the remainder of the circuitry in transponder 90.

In summary, the operation of clock and timing control circuit 110 is such that at the end of the START signal detection, clock 120 is started and counter/divider 124 defines six time slots for tone-pair transmission from transponder 90 to central monitoring station 50. After those six time slots, a RINGBACK enable window is provided, at the end of which transponder 90 is reset to wait until it is next polled.

Figure 5:
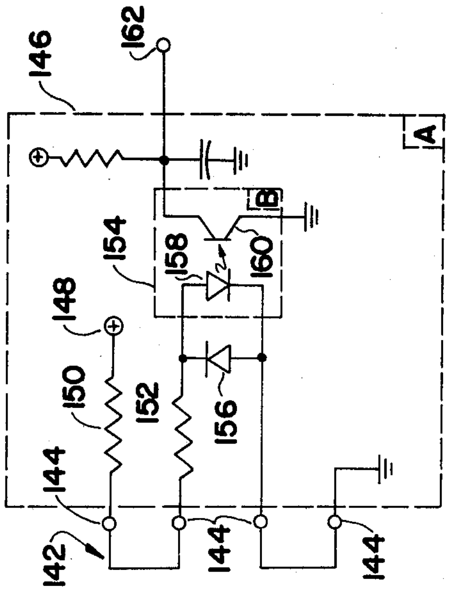
FIG. 5 shows a detailed schematic circuit diagram of the interface between condition sensors at the protected premises and the transponder unit.

At the protected premises, condition sensors are coupled to transponder unit 90 through a loop interface arrangement, illustratively as shown in FIG. 5. The condition sensors, such as door open detectors, window open detectors, panic buttons, etc., are wired into a four-wire loop, designated by the reference numeral 142 in FIG. 5, wherein the sensors maintain a normally closed path. Loop 142 is connected to the four input terminals 144 of loop interface 146. When loop 142 provides a closed path, a current path is set up from voltage source 148 through resistor 150, through the closed upper portion of loop 142 and through resistor 152. The current then enters opto-isolator 154 and passes through the closed lower portion of loop 142 to ground. Diode 156 provides protection for opto-isolator 154. Opto-isolator 154 includes a light emitting diode 158 optically coupled to the base of photo transistor 160. When current flows through light emitting diode 158, this causes photo transistor 160 to turn on, applying a low logic level at the output terminal 162 of interface 146. In the event a condition sensor connected in loop 142 opens the loop, the current path is interrupted and photo transistor 160 is turned off, putting a high logic level on output terminal 162.

The different condition sensors are arranged in "zones," the alarm system only being able to distinguish which zone has an alarm condition thereat and not being able to distinguish which particular condition is in an abnormal state. Therefore, associated condition sensors, such as all window and door opening detectors, for example, should be wired in the same loop.

Referring back to FIGS. 2A and 2B, it is seen that several zones and corresponding loop interfaces are provided. The loop interfaces having the designation A in the lower right corner thereof are identical with the loop interface 146 described with reference to FIG. 5. The condition sensors grouped into Zone 1 are divided into two subgroups respectively connected to loop interface 164 and loop interface 166. The first of the two subgroups is referred to as the DAY loop and is comprised of condition sensors which are monitored all day (i.e. 24 hours). The DAY loop condition sensors are connected to loop interface 164. The second subgroup of Zone 1 condition sensors are designated the NIGHT loop sensors and are connected to loop interface 166. The sensors in the NIGHT loop are only monitored during unoccupied times of the protected premises. For example, the sensor mounted on the front door of the protected premises would be connected in the NIGHT loop because when the protected premises is occupied, the front door would be repetitively opened and closed. The outputs of loop interfaces 164 and 166 are connected, by leads 168 and 170 respectively, to DAY-NIGHT control logic circuit 172, the details of which will be described hereinafter.

A further group of condition sensors, designated ZONE 2, are wired into loop interface 174, the details of which are identical to that described with reference to FIG. 5. The ZONE 2 condition sensors may be of any desired type, such as panic buttons disposed at bank teller cages to warn of a hold-up attempt. These sensors are designed to be monitored around the clock. The output of loop interface 174 is coupled to OR gate 176 via lead 178.

Figure 6:
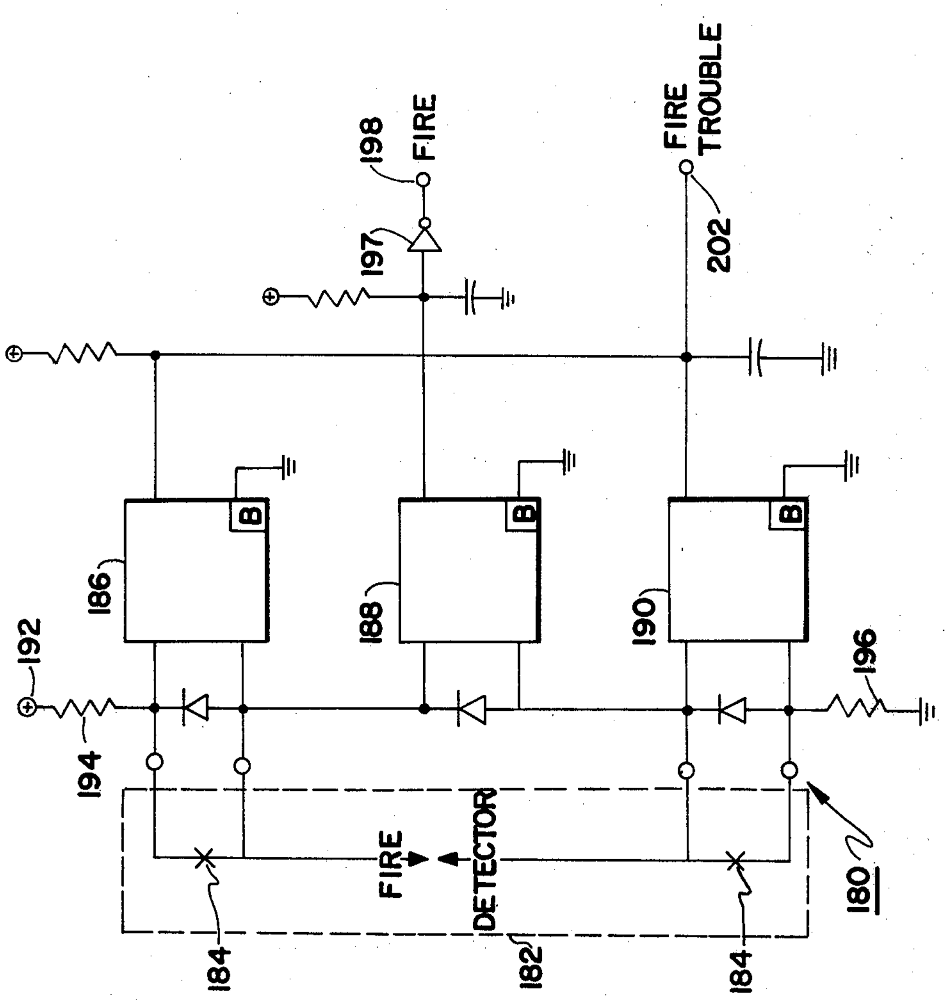
FIG. 6 shows details of the fire and fire trouble interface in the transponder unit.

To detect and report a fire, supervised fire control loop interface 180 is provided. The details of interface 180 are shown in FIG. 6. Interface 180 is designed to meet the requirements of Underwriters Laboratory for a Class A fire loop. These requirements are that a trouble signal must be transmitted on an open or a single ground fault and an alarm must be transmitted on a short between the loops. The trouble signal indicates that something happened to the wiring and the alarm signal indicates that there is actually a fire alarm. In order to accomplish this, all the fire sensors are coupled into a fire control box. This fire control box is not shown but it is functionally indicated by the dashed line box 182 designated fire detector, which shorts the two loops together, as shown by the opposed arrowheads, when any of the fire sensors indicate the presence of a fire. The fire trouble function of the fire control is functionally shown as the normally closed contacts 184 in the two loops. In the event of a malfunction in the wiring, these loops are opened. Loop interface 180 further comprises three opto-isolators 186, 188 and 190 each identical to opto-isolator 154 described with reference to FIG. 5, as designated by the letter B in the lower right corners thereof. When all conditions are normal, current flows from voltage source 192 through resistor 194, through the upper loop, through normally closed contact 184, through opto-isolator 188, through the lower loop, through normally closed contact 184, and through resistor 196 to ground. Therefore, a low signal is present at the output of opto-isolator 188, which signal is inverted by inverter 197 to apply a high logic level at the FIRE output terminal 198. Since no current flows through opto-isolators 186 and 190, a high logic level is applied to FIRE TROUBLE output terminal 202. If a fire is detected, fire detector 182 shorts opto-isolator 188, thereby putting a low logic level on FIRE output terminal 198. In the event there is a problem in the wiring, one of normally closed contacts 184 is opened, thereby allowing current to flow through its associated opto-isolator 186 or 190, applying a low logic level to FIRE TROUBLE output terminal 202.

The Zone 1 DAY and NIGHT loop signals on leads 168 and 170, respectively, are applied to DAY-NIGHT control logic circuit 172. Circuit 172 performs two functions. The first of these functions is to inhibit reporting of sensed conditions on the NIGHT loop when the transponder is in its DAY mode of operation. The second function of circuit 172 is to prevent transponder 90 from being switched to its NIGHT mode of operation unless all DAY and NIGHT loop conditions are normal and the transponder battery is functioning properly. The operation of circuit 172 will be described with reference to FIG. 7.

Figure 7:
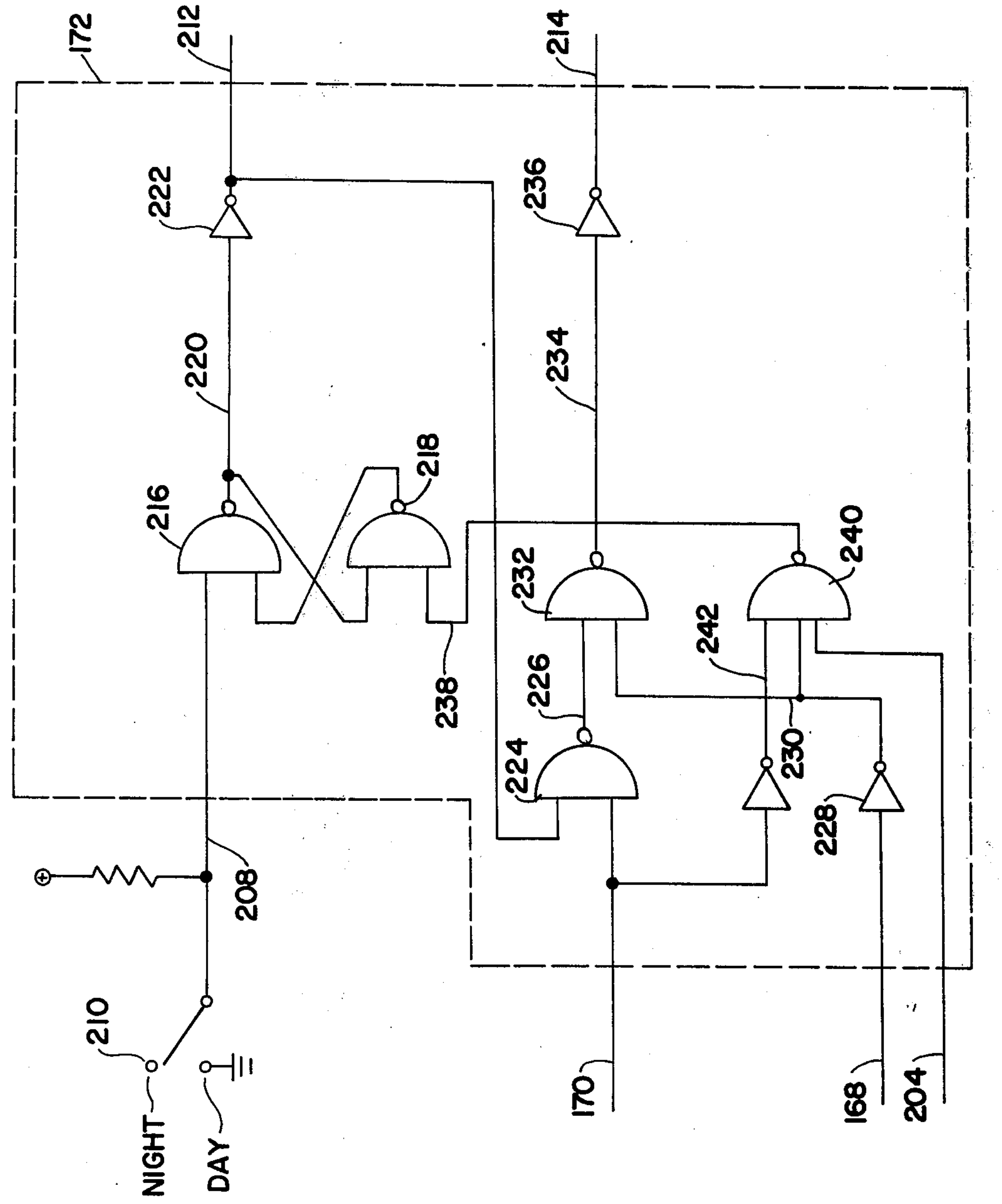
FIG. 7 shows details of the DAY/NIGHT control logic circuitry in the transponder unit.

Referring now to FIG. 7, circuit 172 is seen to have four inputs and two outputs. The input on lead 168 is the DAY loop condition which is normally low. The input on lead 170 is the NIGHT loop condition which also is normally low. The input on lead 204 provides an indication of the battery condition and is normally high if the battery is functioning properly. This lead 204 comes from the transponder unit power supply 206 (FIGS. 2A and 2B). The last input to circuit 172 is lead 208 which comes from DAY/NIGHT switch 210. When switch 210 is in the NIGHT position a high signal appears on lead 208 and when switch 210 is in the DAY position a low signal appears on lead 208. The outputs of circuit 172 are the switch condition indication on lead 212 and the Zone 1 alarm indication on lead 214. Lead 212 is low in the DAY condition and high in the NIGHT condition. To illustrate the operation of circuit 172, first assume that switch 210 is in the DAY position. A low signal will then be applied to lead 208. Lead 208 is connected to one input of NAND gate 216, which together with NAND gate 218 forms a flip-flop. With a low signal on lead 208, a high signal appears at the output of gate 216 on lead 220. This high signal is inverted by inverter 222 to provide a low signal on lead 212. Lead 212 is connected as one input to NAND gate 224. The other input to NAND gate 224 is lead 170, the NIGHT alarm lead. With a low signal on lead 212, the output of NAND gate 224 on lead 226 will be kept high. The NIGHT alarm loop is therefore prevented from changing the signal on lead 226 when switch 210 is in the DAY position. However, the DAY alarm input on lead 168, which is normally low, is inverted by the inverter 228 to place a high signal on lead 230. This will cause the output of NAND gate 232 on lead 234 to be low. The low signal on lead 234 is inverted by inverter 236 to provide a high signal on Zone 1 alarm lead 214. Thus, only alarms which occur on the DAY loop are transmitted on lead 214 when switch 210 is in the DAY position.

Let us now assume that it is desired to make a transition to the NIGHT mode of operation. When switch 210 is moved to its NIGHT position, a high signal is applied to lead 208. The flip-flop comprising NAND gates 216 and 218 will change state to put a low signal on lead 220 if and only if at this time there is a low signal on lead 238. In order for there to be a low signal on lead 238, all the inputs to NAND gate 240 must be high. The inputs to NAND gate 240 are leads 204, 230 and 242. Lead 204 indicates that the battery in power supply 206 is functioning properly and should normally be high. Lead 230 is the inverted DAY alarm lead 168 and also should normally be high. Lead 242 is the inverted NIGHT alarm lead 170 and also should be normally high. Therefore, if the battery is functioning properly and the DAY and NIGHT loop sensors are normal, a low would appear on lead 238, thereby allowing the flip-flop comprising NAND gates 216 and 218 to change state. A low signal would then be applied to lead 220 which would be inverted to a high signal on lead 212. With a high signal on lead 212, gate 224 is enabled to pass therethrough any alarm signals appearing from the NIGHT loop on lead 170. The output of gate 232 would then be an OR function of the DAY and NIGHT loop alarm conditions.

In the event that switch 210 was moved from its DAY to its NIGHT position when either the signal on lead 204 was low because the battery was not functioning properly, or the signal on lead 230 was low because there was an abnormal alarm condition on the DAY loop or the signal on lead 242 was low because there was an abnormal condition on the NIGHT loop, then the output of gate 240 on lead 238 would be high. This would prevent the flip-flop comprising gates 216 and 218 from changing state and the signal on lead 212 would remain low, indicating the DAY condition. Since lead 212 indicates the DAY condition, transponder 90 would not transmit to central monitoring station 50 a transition from DAY to NIGHT and therefore central monitoring station 50 would not transmit a RINGBACK signal to the transponder unit 90. The person who attempted to operate switch 210 would then realize that an abnormal condition existed. The particular failure (DAY loop, NIGHT loop or battery) would be indicated on the display panel of transponder unit 90, to be described hereinafter, and that person would then rectify the abnormality and reoperate switch 210 before leaving the protected premises.

Referring now to FIGS. 2A and 2B, the presence of an alarm condition causes a corresponding latch circuit to be set. When there is a Zone 1 alarm signal, as indicated by a low-going signal on lead 214, Zone 1 latch 244 is set. When there is a fire alarm signal, as indicated by a low-going signal at terminal 198, fire latch 246 is set. When there is a fire trouble condition, fire trouble latch 248 is set. A Zone 2 alarm condition is transmitted through OR gate 176 to set Zone 2 latch 250. The other input to OR gate 176 is the INITIALIZATION signal which is present the first time that power is applied to the particular transponder unit, and a discussion of this signal will be given in greater detail hereinafter. Initially, the latch circuits 244, 246, 248 and 250 are in their reset states so that their $\overline{Q}$ outputs are high. The $\overline{Q}$ output of latch 244 is on lead 252. The $\overline{Q}$ output of latch 246 is on lead 254. The $\overline{Q}$ output of latch 248 is on lead 256. The $\overline{Q}$ output of latch 250 is on lead 258. These $\overline{Q}$ outputs are applied to report gating circuit 128. The other inputs to report gating circuit 128 are a normally high AC power failure lead 260 from power supply 206, DAY/NIGHT switch indication lead 212, and the output of INITIALIZATION latch 262 on lead 264 which is normally low. The outputs from report gating circuit 128 are applied on leads 266 to tone generator 268. The generation of signals on leads 266 will be described in more detail hereinafter.

Tone generator 268 is illustratively a type MC 14410 integrated circuit manufactured by Motorola Semiconductors. Tone generator 268 is a two-out-of-eight tone encoder. It is designed to accept digital inputs in a two-out-of-eight code format and to digitally synthesize the high and low band sine waves specified by telephone tone dialing systems. The inputs are normally originated from a four-by-four matrix key pad, which generates four row and four column input signals in a two-out-of-eight code format (one row and one column are simultaneously connected to ground). The high band sine wave appears on lead 270 and the low band sine wave appears on lead 272. Lead 270 and 272 are connected to amplifier 274 whose output is connected to telephone line-pair 85.

Report gating circuit 128 comprises a plurality of gates having as one set of inputs the various conditions leads such as, for example, the Zone 1 alarm lead 252. The other set of leads to the gates within report gating circuit 128 are the report gate enable leads 126 from clock and timing control circuit 110. It will be recalled that the report gate enable leads 126 define the six time slots for transmission of the six tone-pairs from transponder 90 to central monitoring station 50. The tone-pairs for transmission, the conditions corresponding thereto, and the time slots in which they occur, are set forth in the table at the bottom of FIG. 3. For example, the fire status is reported in the first time slot and comprises a signal at frequency 1336 hertz and a signal at frequency 941 hertz. Report gating circuit 128 combines its two sets of inputs and decodes them to provide signals on leads 266 which are applied to the row and column input matrix of tone generator 268 so as to enable the proper tone generation in the proper time slot sequence.

It will be further recalled that the presence of a tone-pair in a time slot indicates a normal condition and the absence of a tone-pair in a time slot indicates an abnormal condition or an alarm. Therefore, when an alarm condition occurs and its respective latch 244, 246, 248, or 250 is set, the corresponding $\overline{Q}$ output lead from the latch will go low and report gating circuit 128 will not provide a signal to tone generator 268 in the time slot corresponding to the condition. When a latch is set, it will remain set for three polls of the transponder unit so that the alarm indication will be transmitted three times. Each latch has associated with it a counter to effectuate this functioning. For example, when fire latch 246 is set by a fire alarm signal causing terminal 198 to go low, the Q output of latch 246 on lead 276 goes high. Lead 276 is connected to enable counter 278 which is a binary counter adapted to provide an output on lead 280 when its count is three. It will be recalled that at the end of a poll of the transponder unit, clock and timing control circuit 110 provides a reset pulse on lead 140. The combination of the pulse on lead 140 with the enabling signal on lead 276 causes counter 278 to increment by one. At the end of the third polling of the transponder unit, counter 278 is at a count of three and the consequent output on lead 280 resets latch 246. Of course, if the alarm condition still persists at terminal 198, latch 246 will immediately be set again and the count cycle will be repeated.

As previously described, clock and timing control circuit 110 provides a RINGBACK enable window signal on lead 132. Lead 132 is connected to RINGBACK control circuit 282. Also connected to RINGBACK control circuit 282 is lead 212 from DAY-NIGHT control logic circuit 172. The final input to RINGBACK control circuit 282 is the output of 2250 hertz tone detector 104 on lead 108. Illustratively, RINGBACK control circuit 282 comprises a type 221 integrated circuit one-shot multivibrator connected so that the only time it provides an output pulse on lead 284 is when the signal on lead 212 indicates that switch 210 is in the NIGHT position, the RINGBACK enable window signal on lead 132 is present, and a 2250 hertz tone is detected by detector 104, as indicated by the proper level signal on lead 108. The only time all three conditions simultaneously occur is at the end of the first poll of the transponder after switch 210 has been moved from the DAY to the NIGHT position, as is apparent from the foregoing description. At such time, a RINGBACK signal, illustratively of five second duration, is applied to lead 284. This signal may be utilized to light a light or sound an audible device, as desired, in order to notify the person who operated switch 210 that the DAY to NIGHT transition is valid and has been received by the central monitoring station. It should be noted at this point that the provision of the 2250 hertz signal by central monitoring station 50 during the RINGBACK enable window is automatic upon receipt by central monitoring station 50 of the DAY to NIGHT transition.

If desired, a relay 286 may be provided to sound a local alarm responsive to the occurrence of a Zone 1 alarm condition. It is further apparent that the other alarm conditions may also be wired to suitable local alarms.

A requirement set forth by Underwriters Laboratory for the type of alarm system herein described is that like-type equipment cannot be substituted at the protected premises without the central monitoring station being made aware of such substitution. To satisfy this requirement, the herein-described system is designed so that the first time a transponder unit has power applied to it, it transmits a unique code to the central monitoring station 50. To accomplish that objective, the circuitry depicted in FIG. 2 utilizes the Zone 2 time slot to transmit an INITIALIZATION tone-pair, as shown in the table at the bottom of FIG. 3. When power is applied to the transponder unit, a positive going signal appears on lead 288 to set power up latch 290. The resulting positive signal on Q output lead 292 of latch 290 sets INITIALIZATION latch 262 and passes through OR gate 176 to set Zone 2 latch 250. The signal on lead 258 then goes low which inhibits the transmission of the Zone 2 tone-pair. The Q output of INITIALIZATION latch 262 on lead 264 goes high as an input to report gating circuit 128, thereby causing the INITIALIZATION tone-pair to be transmitted in the Zone 2 time slot after the next START tone receipt. Power up latch 290 is cleared by the pulse on lead 108 the first time that the transponder unit is polled and counter 294 clears Zone 2 latch 250 and INITIALIZATION latch 262 after three polls of the transponder unit.

Although not shown, the first time that power is applied to the transponder, a pulse is generated to clear all the latches so the system initiates operation with no alarm conditions set into it.

Power supply 206 is adapted to be connected to a source of AC power. Its input stage is illustratively a full-wave bridge rectifier from which unregulated DC power may be obtained. Further stages filter and rectify this power and provide a trickle charge for the transponder battery. Advantageously, the unregulated power is utilized to drive the transponder display panel which will be subsequently described, so that in the event the AC power goes out, the light emitting diodes in the display do not drain the battery and also provide an alert for persons on the protected premises. The unregulated power is advantageously utilized to provide the AC fail signal on lead 260 between power supply 206 and report gating circuit 128.

The transponder unit 90 has a display panel comprising a light emitting diode (LED) associated with the input of each of the alarm latches 244, 246, 248 and 250. Additionally, an LED is provided to indicate the status of the battery and is associated with the circuitry in power supply 206 which provides the battery fail signal on lead 204.

DESCRIPTION OF CENTRAL MONITORING STATION

Figure 8A:
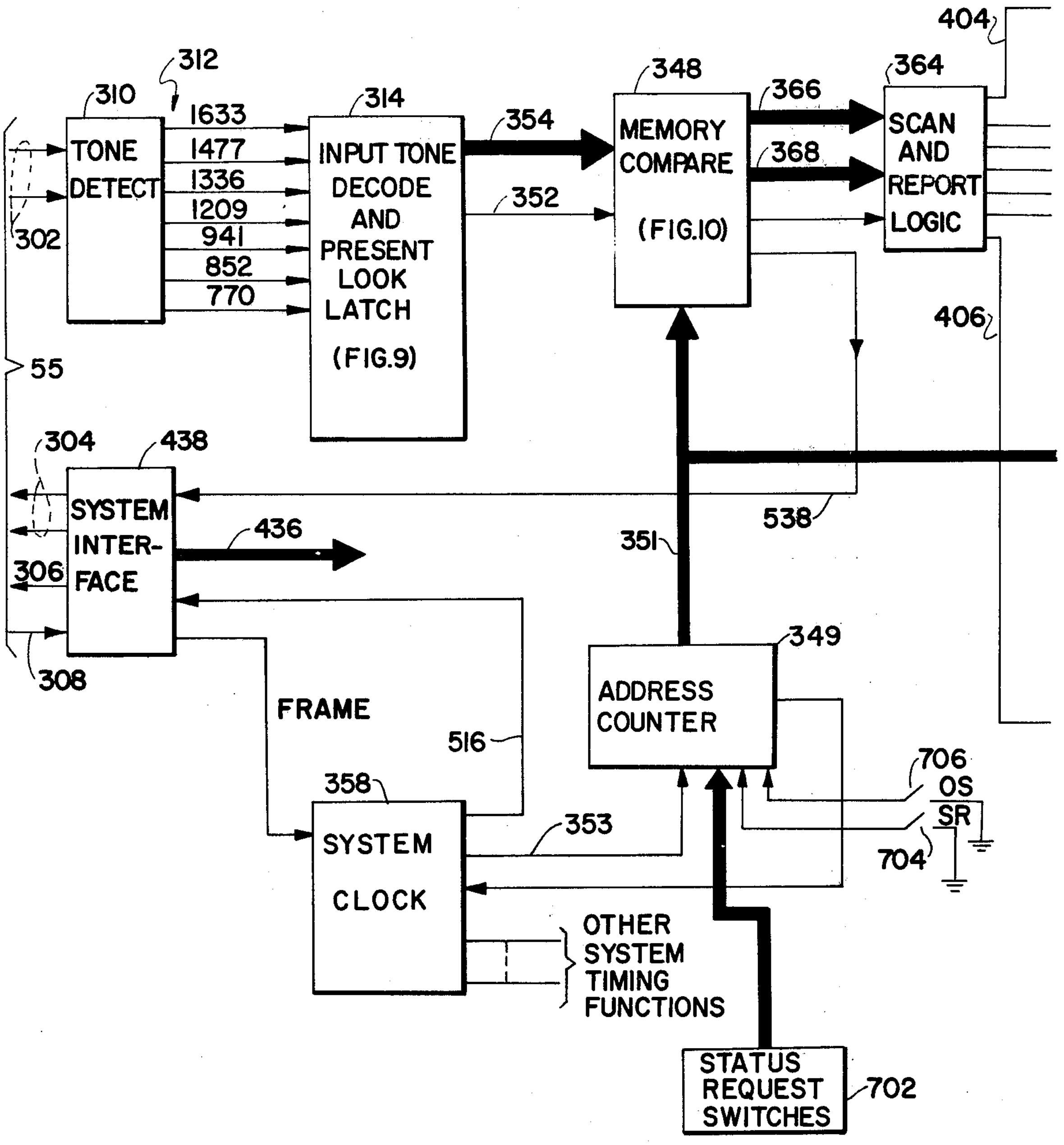
FIGS. 8A and 8B, with FIG. 8A placed to the left of FIG. 8B, depicts a block schematic diagram of the central monitoring station.
Figure 8B:
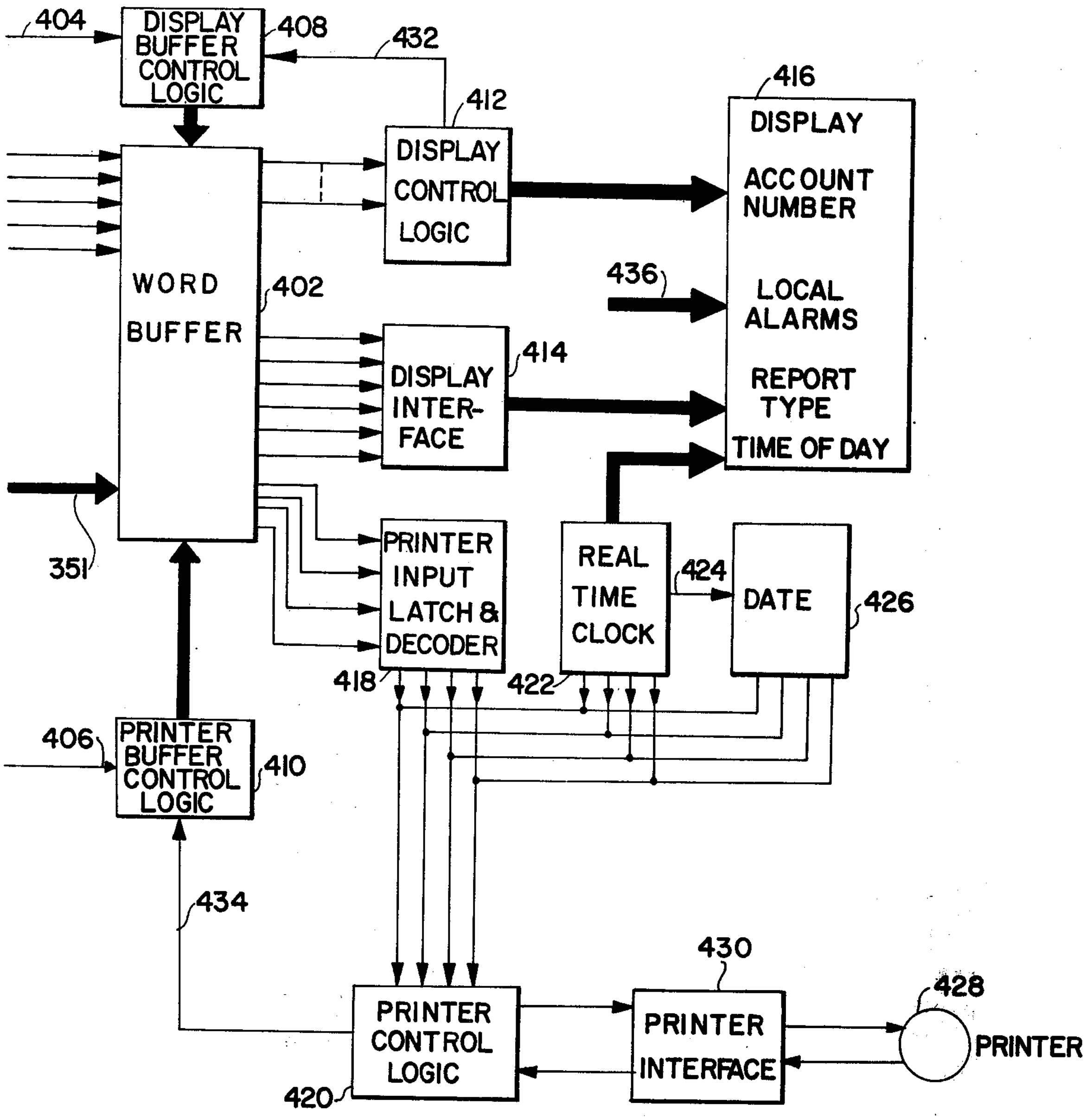

Referring now to FIGS. 8A and 8B, shown therein is a block schematic diagram of the central monitoring station 50. Central monitoring station 50 is connected to SCU 60 (FIG. 1) by cable 55. Cable 55 includes a four-wire voiceband channel comprising receive pair 302 and transmit pair 304. In addition, cable 55 includes a DC step lead 306 and a frame lead 308. Although not shown, a ground line is also included in cable 55. Receive pair 302 is coupled to the input of tone detector circuit 310. The only signals which appear on receive pair 302 are the tone-pairs in the six defined time slots which are transmitted by the transponder unit to which the central monitoring station is connected. Tone detector 310 is illustratively comprised of elements from the Beckamn Series 883 Telephone Tone Receiver Products, manufactured by Beckman Instruments Inc. The output of tone detector 310 comprises a group of leads 312, each corresponding to a possible input frequency on receive pair 302. The output signals on leads 312 will be a pair of negative going pulses corresponding to the tone-pair received from the transponder unit. More particularly, during a connection to a transponder unit, six pairs of pulses, in time sequence, will appear on output leads 312. The individual ones of output leads 312 are labeled according to the frequency tone which causes a pulse to appear thereon. For example, the lead labelled 1336 will have a pulse thereon when a tone of frequency 1336 hertz is received by tone detector 310 over the receive pair 302. As is apparent from FIG. 3, this will occur during the first and fourth tone-pair time slot, unless there is an alarm condition corresponding to those time slots.

Figure 9:
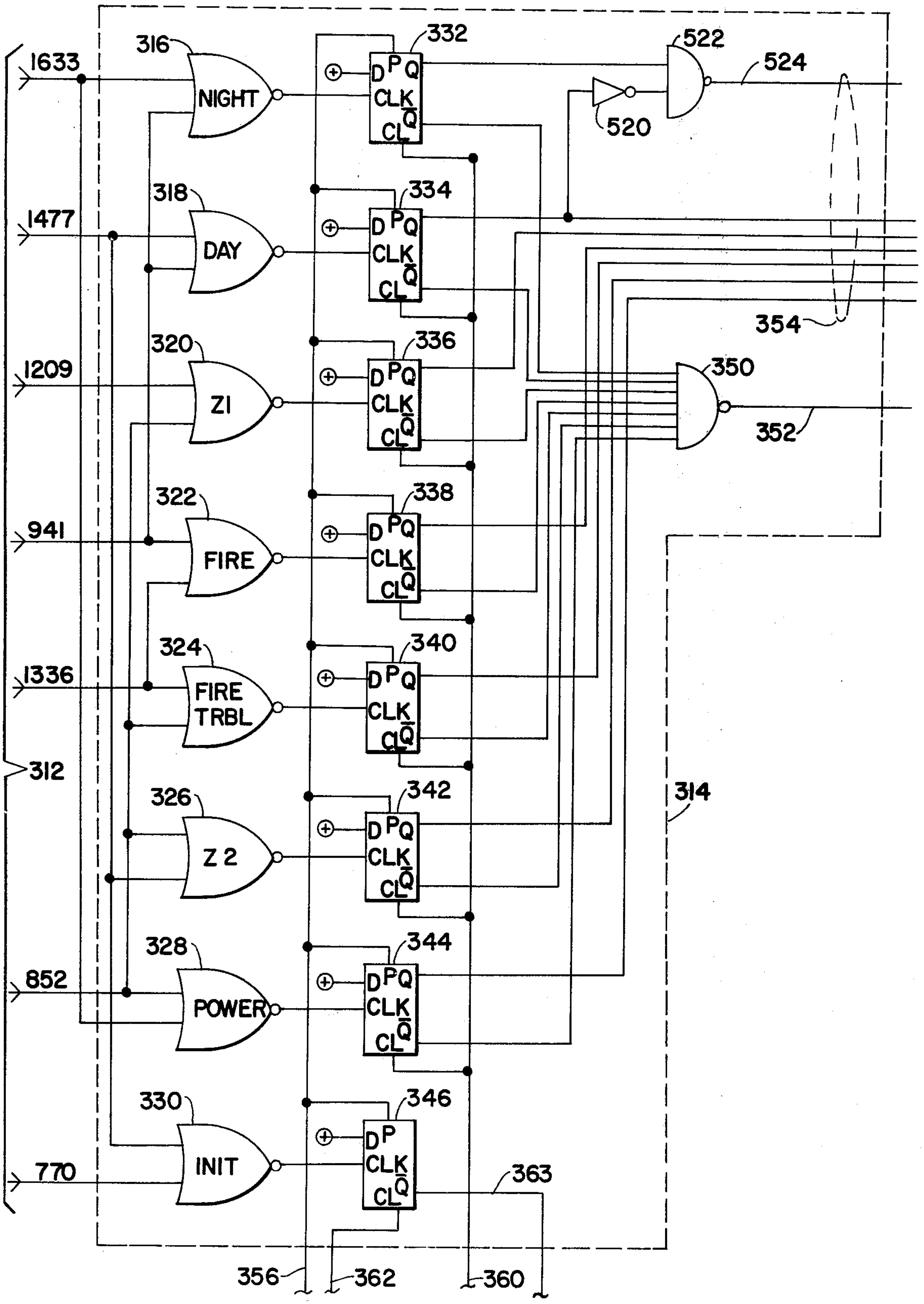
FIG. 9 shows details of the input tone decoder and present look latch circuit in the central monitoring station.

Leads 312 are applied to input tone decode and present look latch circuit 314, shown in more detail in FIG. 9. Referring now to FIG. 9, it is seen that the pulses on leads 312 are coupled to a plurality of decoding NOR gates 316, 318, 320, 322, 324, 326, 328 and 330. Each of these decoding gates 316–330 is labeled with the condition name with which it is associated. The decoding gates 316–330 are arranged to have as inputs the proper two of the lines 312 corresponding to which of the frequencies they are associated with. For example, decoding gate 326 is the Zone 2 decoding gate and it has as its inputs the leads corresponding to the frequencies 1477 hertz and 852 hertz. Therefore, when pulses appear on the leads corresponding to those two frequencies, a positive pulse will appear at the output of gate 326. Each of the gates 316–330 is associated with a corresponding one of the latches 332, 334, 336, 338, 340, 342, 344 and 346. These latches will be referred to as the "present look latches." Each of the latches 332–336 illustratively is a D-type flip-flop which is set by a positive going pulse on its CLK input. The CLK inputs of the latches 332–346 are coupled to the outputs of the corresponding decoding gates 316–330. Therefore, assuming no alarm conditions, as the six tone-pairs are received from a transponder unit, six out of the eight present look latches 332–346 will be set in sequence during the six tone-pair transmission time slots, corresponding with the table at the bottom of FIG. 3. The outputs of the present look latches, except for the INITIALIZATION latch 346, are utilized in a manner to be described hereinafter, by memory compare circuit 348 to compare the present condition of the transponder to its previous condition.

NAND gate 350 is coupled to receive the $\overline{Q}$ outputs of latches 332–344. The output of gate 330 on lead 352 will be high if any of the latches 332–344 is set by receipt of a tone-pair. The only time that lead 352 will be low is when no tone-pair is received. This indicates a line-out condition. Although it is possible that there might be alarm conditions in all the zones, so that no tone-pair is transmitted for those zones, there will always be a transmission indicating that the transponder is in its DAY or NIGHT mode of operation. Therefore, if no tone pairs at all are received, this indicates that the line to a particular transponder is out. The Q outputs of the present look latches 332–344 are presented to memory compare circuit 348 via lead 354, as is the line-out signal on lead 352.

The latches 332–346 are conditioned by a signal on lead 356 from the system clock circuit 358 to accept the incoming tone-pair signals through the corresponding decoding gates. Additionally, at the end of a connection to the transponder unit, system clock 358 presents a signal on lead 360 to clear the present look latches 332–344 and on lead 362 to clear the INITIALIZATION present look latch 346. The output of INITIALIZATION present look latch 346 on lead 363 is utilized to notify personnel at station 50 that a transponder has come on line for the first time.

Figure 10:
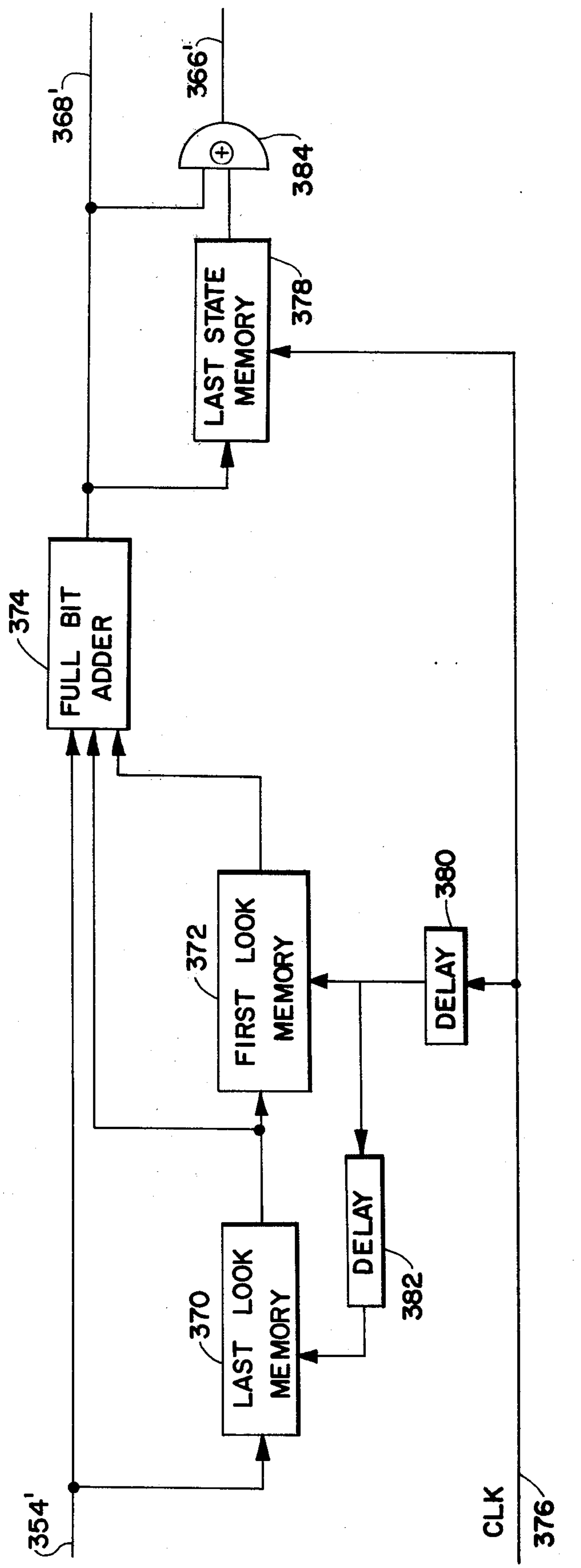
FIG. 10 functionally depicts the operation of the memory compare circuit in the central monitoring station.

The present look signals on leads 354 are transmitted to memory compare circuit 348. Memory compare circuit 348 does the two-out-of-three look previously mentioned, and provides to scan and report logic circuit 364 over leads 366 (one corresponding to each of the present look latches) when a change of condition is noted and also over leads 368 (again one corresponding to each of the present invention look latches) whether the change of condition is an alarm condition or a reset condition. Memory compare circuit 348 comprises three random access memories denoted the "last look" memory, the "first look" memory and the "last state" memory. All three memories are simultaneously and identically addressed, the address corresponding to the port to which the system is connected. This address comes from address counter 349 over leads 351. Address counter 349 operates by counting pulses supplied to it over lead 353 from system clock 358. The pulses on lead 353 comes at the end of a port scan. FIG. 10 functionally depicts the operation of memory compare circuit 348.

Referring now to FIG. 10, assuming that the system is functioning normally and there are no alarm conditions, the present look bit on lead 354', corresponding to one of the leads 354, will be a ONE. The last look bit stored in the last look memory 370 will also be a ONE because the last time the system looked at that port, everything was normal. And the time before that, everything was normal, so the first look bit stored in first look memory 372 will also be a ONE. The present look bit on lead 354', the last look bit from last look memory 370, and the first look bit from first look memory 372, are all presented as inputs to full bit adder circuit 374. The output of full bit adder 374 on lead 368' is the carry bit from the addition of the three bits presented at the input of full bit adder 374. If the carry bit on lead 368' is a ONE this means that the system is okay. At the end of that scan, the clock input on lead 376 gates the carry bit output of full bit adder 374 into last state memory 378. After a delay, as functionally indicated by delay element 380, the last look bit from last look memory 370 is gated into first look memory 372. After a further delay, as functionally indicated by delay element 382, the present look bit on lead 354' is gated into last look memory 370.

In the event that the next scan of that port indicates an alarm condition by the presence of a low signal on lead 354', the last look memory and the first look memory inputs to full bit adder 374 will both be ONE and therefore there will still be a carry so the output on lead 368' will be a ONE. However, when the clock pulse appears on lead 376, last look memory 370 will have a ZERO gated into it. The next time that that port is scanned, there will again be a ZERO on the present look input 354' because at the transponder, the alarm latch remains set for three scans. Therefore, of the three inputs to full bit adder 374, only the input from first look memory 372 will be a ONE. Therefore, there will be no carry and the output of full bit adder 374 on lead 368' will be a ZERO. Exclusive OR gate 384 compares the output of full bit adder 374 on lead 368' with the bit in last state memory 378 and provides a ONE output on lead 366' to indicate that a change of condition has occurred. However, the ONE output on lead 366' only indicates that a change has occurred and does not indicate whether than change is to an alarm or a reset condition. To determine whether the change is to an alarm or reset condition, the signal on lead 368' must be examined. If this signal is a ONE that indicates that the change is to a reset condition. If the signal on lead 368' is a ZERO, this indicates that the change is to an alarm condition.

As shown in FIGS. 8A and 8B, the information on leads 366 and 368 are transmitted to scan and report logic circuit 364. Scan and report logic circuit 364 takes this information, in a manner to be described in more detail hereinafter, and presents the information to word buffer circuit 402 along with control signals on leads 404 and 406 to display buffer control logic 408 and printer buffer control logic 410, respectively. As will be described hereinafter, word buffer 402 comprises two storage registers which contain identical information. One of the storage registers is for the display and the other storage register is for the printer. The output of the display storage register is presented to display control logic 412 and display interface 414. These latter two circuits provide information signals in the proper format to central monitoring station display unit 416. The information in the printer storage register in word buffer 402 is presented to printer input latch and decoder circuit 418. Circuit 418 presents the alarm information in the proper format to printer control logic circuit 420. Real time clock circuit 422 is coupled to both the display unit 416 and the printer control logic circuit 420. Additionally, real time clock circuit 422 provides one pulse every twenty-four hours over lead 424 to date circuit 476 which is also coupled to printer control logic 420. The central monitoring station is provided with a hard copy printer 428, which is coupled to printer control logic circuit 420 by a printer interface circuit 430 which, as determined by the thpe of printer 428 actually utilized, provides the proper interfacing signals between printer control logic 420 and printer 428. After each display of an alarm condition, display control logic 412 sends a control pulse signal to display buffer control logic circuit 408 over lead 432. Similarly, after each printer operation, printer control logic circuit 420 sends a corresponding pulse to printer buffer control logic 410 over lead 434.

At this point, a general discussion of the printing and display function is in order. The described system is designed so that, whenever there is a change of condition at a remote protected premises, that change is automatically printed and an audible alarm is generated at the central monitoring station 50 which requires the acknowledgment thereof by the operator, who may then take the appropriate action such as calling the local Fire Department or Police Department. Each protected premises is assigned an account number which corresponds to the port number. Each printout from printer 428 includes the account number, day or night, the type of report (i.e. Zone I), condition (alarm or reset), the date and the time of day. The operator is provided with an acknowledge button which, when depressed, causes the report information to be presented on visual display 416. This display includes the account number and the report type and condition. Additionally, display 416 continually displays the time of day. Furthermore, local alarms are presented on display 416 as determined by the information presented over leads 436 from system interface circuit 438. These local alarms include such indications as the receipt of a frame signal over lead 308, an AC power failure, a low paper indication from the printer, loss of frame signal over lead 308 (system failure), etc. Printer 428 prints out the alarm condition whenever it occurs. Display 416 only displays the alarm information upon request by the operator. It therefore follows that two different storage registers are required in word buffer 402. One of the storage buffers is for the printer and the other is for the display. Although they contain the same information and are written into simultaneously at the same addresses, information is read out of these storage registers at different times, almost immediately for the printer and at some later time for the display. This operation will become more apparent by the following description of FIG. 11.

Figure 11:
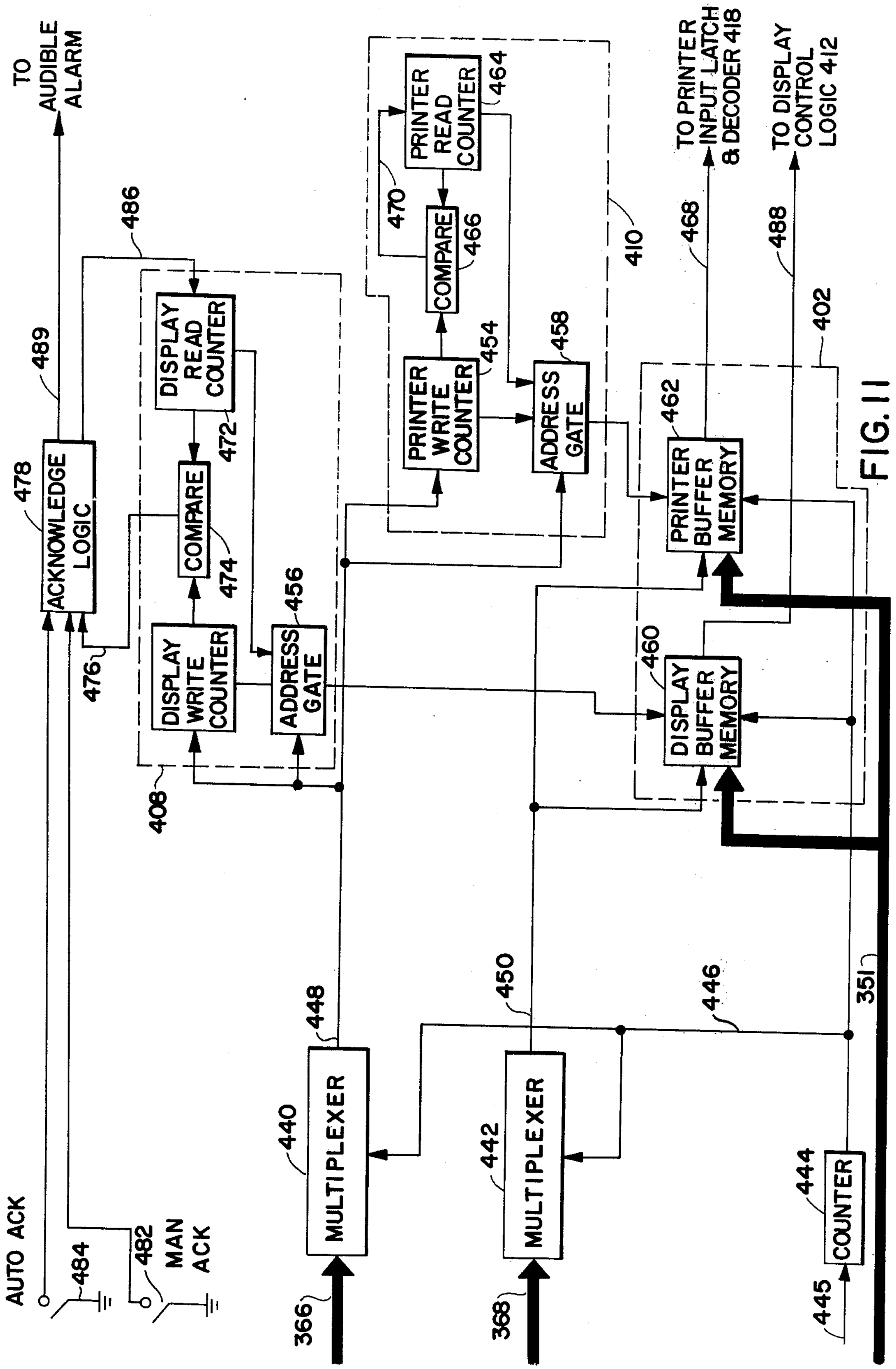
FIG. 11 is a functional schematic of the display and printer control circuitry in the central monitoring station.

Referring now to FIG. 11, the report type information is presented over leads 366 to multiplexer circuit 440 and the alarm/reset information is presented over leads 368 to multiplexer circuit 442. Counter 444 receives pulses over lead 445 from system clock 358. The output of counter 444 corresponds to the present look latches being scanned by multiplexers 440 ad 442. Multiplexers 440 and 442 operate in response to the counter 444 outputs on leads 446 to sequentially place the signals appearing on leads 366 and 368 on their respective output leads 448 and 450. When a signal appears on lead 448, this indicates that a condition transition has occurred. At the same time, the signal on lead 450 indicates whether the transition is to an alarm state or to a reset state. The signal on lead 448 enables address gates 456 and 458 to cause their respective buffer memories 460 and 462 to have stored therein the information presented on leads 450, 446 and 351. After which the signal on lead 448 causes display write counter 452 in display buffer control logic circuit 408 to be incremented and, at the same time, causes printer write counter 454 within printer buffer control logic circuit 410 to be incremented. (Buffer memories 460 and 462 correspond to the two storage registers previously mentioned). The information on leads 351, it will be recalled come from address counter 349 and contains the account number (i.e. the port being scanned). The information on leads 446 indicates the particular condition being scanned (i.e. fire, fire trouble, zone 2, etc.). The information on lead 450 indicates whether the condition that changed was a reset or an alarm status. Thus, the display buffer memory 460 and the printer buffer memory 462 within word buffer 402 are caused to have at the same address, as determined by display write counter 452 and printer write counter 454 respectively, the same information stored therein. Since display write counter 452 and printer write counter 454 are incremented by the same pulse at the same time over lead 448 they too contain the same count information therein.

Printer buffer control logic circuit 410, as shown in FIG. 11, operates to cause the printing out of information whenever a change of status occurs. To accomplish this, the output of printer read counter circuit 464 is presented to compare logic circuit 466. Also presented to compare logic circuit 466 is the output of printer write counter 454. Printer write counter contains therein the address within printer buffer memory 462 which was last written into. The contents of printer read counter 464 is the address within printer buffer memory 462 whose contents were last gated out over leads 468 to the printer input latch and decoder circuit 418. In the case of the printer buffer memory 462, the addresses in printer write counter 454 and printer read counter 464 are identical until a pulse appears on lead 448 which causes printer write counter 454 to be incremented. When this occurs, compare logic circuit 466 will recognize a discrepancy between the two addresses and will cause a pulse to appear on lead 470. This pulse indicates that information is present that is to be printed out. The pulse on lead 448 will cause address gate circuit 458 to gate through to printer buffer memory 462 the contents of printer read counter 464. This will be the same address that was previously gated through from printer write counter 454 and will cause printer buffer memory 462 to present the contents of that corresponding memory location to printer input latch and decoder circuit 418 for printing by printer 428. The termination of the pulse in lead 448 will cause printer read counter circuit 464 to be incremented.

The operation of display buffer control logic 408 differs from that described with respect to printer buffer control logic 410 because the displaying of information is not performed automatically, but rather is controlled by the human operator at central monitoring station 50. Display write counter 452 contains therein the address within display buffer memory 460 that was last written into. Display read counter contains therein the address within display buffer memory 460 whose contents were last displayed. For example, several condition transitions may have occurred before the operator was able to acknowledge receipt of a transition. Therefore, display read counter 472 would have an address therein which was several numbers removed from the address within display write counter 452. The contents of display write counter 452 and display read counter 472 are presented to compare logica circuit 474 which, when it notes a discrepancy therebetween, provides an information present signal on lead 476 to acknowledge logic circuit 478. When acknowledge logic circuit 478 recognizes the presence of an information present signal on lead 476, it provides a signal on lead 480 which sounds an audible alarm at the central monitoring station 50. The human operator at central monitoring station 50 will then depress either the manual acknowledge button 482 or the automatic acknowledge button 484. Assuming at first that the manual acknowledge button 482 is depressed, this causes acknowledge logic circuit 478 to provide a pulse on lead 486 to gate the address in display read counter 472 through address gate 456 to display buffer memory 460, the contents of that address then being transmitted to display control logic 412 over leads 488 for display on the display unit 416. At the termination of the pulse on lead 486, display read counter 472 is incremented. If the contents of display read counter 472 are still different from the contents of display write counter 452, compare circuit 474 will again place a signal on lead 476 which will cause acknowledge logic circuit 478 to sound the audible alarm. When the operator depresses manual acknowledge switch 482, the aforedescribed cycle is repeated. However, if the operator had depressed auto acknowledge switch 484, circuitry within acknowledge logic circuit 478 inhibits generation of the signal on lead 480 and causes display read counter 472 to quickly cycle through its addresses until it catches up to display write counter 452. This causes a quick display of the contents of all the memory locations within display buffer memory 460, which display would not be readily comprehensible by the operator. However, the contents of all those memory locations would have been printed out on the printer. The foregoing circuitry provides a backup in case of printer failure. The operator must utilize the manual acknowledge switch 482 to slowly cycle through and display the conditions at which transitions occurred in case the printer failed and could not provide a hard copy of such conditions.

Figure 12:
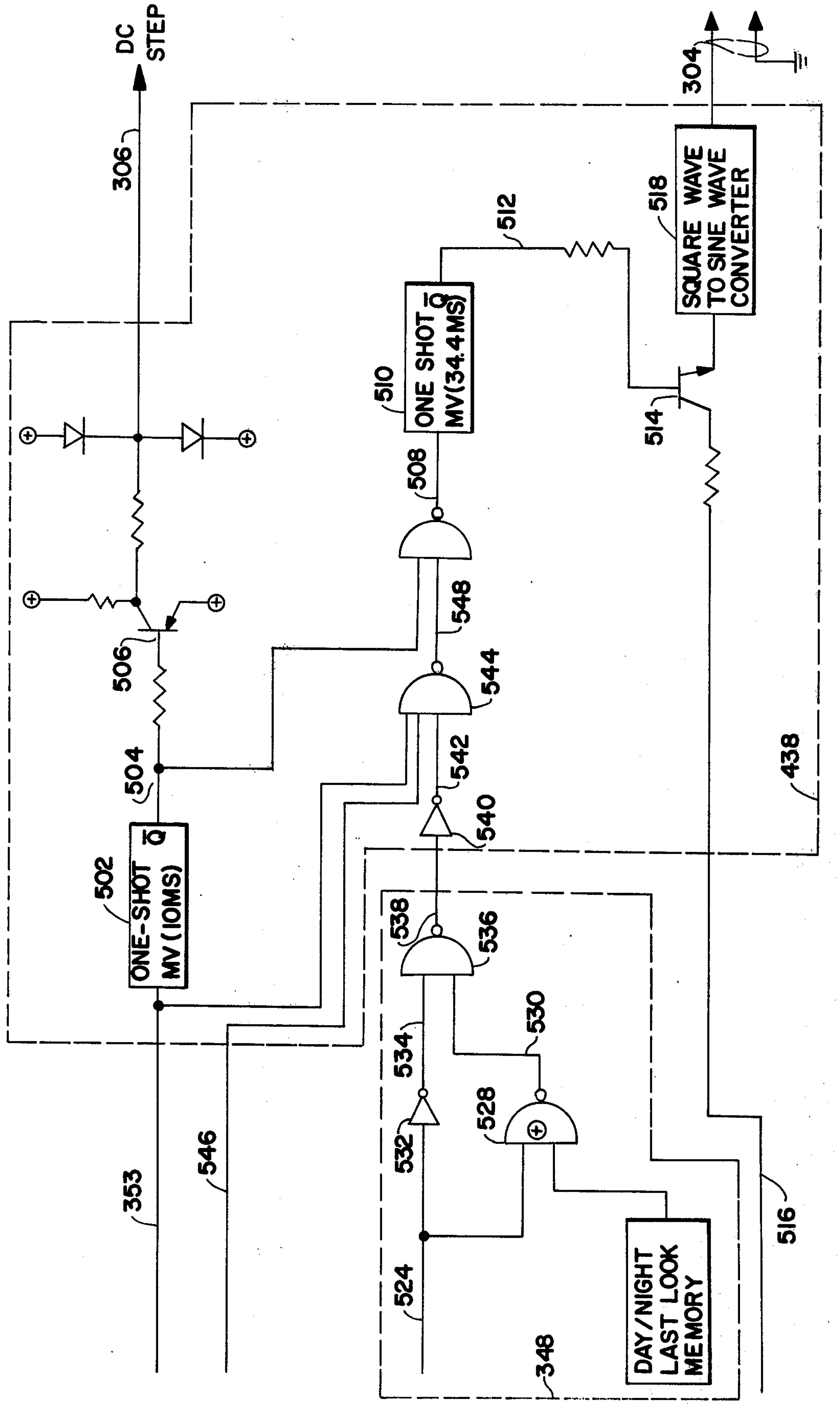
FIG. 12 is a block schematic showing details of the outgoing signal generation from the central monitoring station to the Bell System equipment.

Referring now to FIG. 12, depicted therein is a block diagram showing how the outgoing signals from central monitoring station 50 are generated. It will be recalled that there are three different signals generated by central monitoring station 50. A DC step signal on lead 306 is transmitted to the Bell System equipment at the end of each port scan to cause the Bell System equipment to set up a connection to the next port. The other signals are the START tone and the RINGBACK tone, both of frequency 2250 hertz. Both of these signals last for the same duration but occur at different time intervals during the port scan. To generate the DC step pulse on lead 306, at the end of the scanning of a port, it will be recalled that system clock 358 generates a pulse on lead 353 to increment address counter 349. The trailing edge of this pulse triggers one-shot multivibrator circuit 502 which is arranged to provide a ten millisecond negative going pulse on lead 504. This pulse on lead 504 turns on transistor 506 for ten milliseconds, which causes a positive going DC step pulse to be applied on lead 306. The negative going pulse on lead 504 causes a positive going pulse to appear on lead 508 the trailing edge of which triggers one-shot multivibrator circuit 510 to provide a 34.4 millisecond positive going pulse on lead 512. This causes transistor 514 to be turned on for 34.4 milliseconds. Applied to lead 516 from system clock 358 is a square wave of frequency 2250 hertz. This 2250 hertz square wave signal on lead 516 is always present. During the 34.4 millisecond period when transistor 514 is turned on, the 2250 hertz square wave signal is applied to square wave to sine wave convertor circuit 518 which causes the START signal of 2250 hertz to be applied to leads 304. Referring for a moment back to FIG. 9, when a NIGHT condition is set in the present look latches, gates 520 and 522 cause a negative going signal to appear on lead 524. This signal is compared with the signal present in the DAY/NIGHT last look memory 526 (FIG. 12) by exclusive OR circuit 528. The only time exclusive OR circuit 528 provides a positive output on lead 530 is when the last look indication was that the corresponding transponder unit was in the DAY mode and the present look now indicates that the transponder unit is in the NIGHT mode. The negative signal on lead 524 is inverted by inverter 532 to become a positive signal on lead 534. Therefore, under these circumstances, NAND gate 536 will provide a negative signal on lead 538 which is inverted by inverter 540 to present a positive signal on lead 542 to one input of NAND gate 544. A second input to NAND gate 544 is the pulse on lead 353 which occurs at the end of the port scan. The third input to NAND gate 544 is a pulse on lead 546 which comes from system clock 358 to define the RINGBACK enable window. The concurrence of the positive signals at the input to NAND gate 544 causes a negative pulse to appear at lead 548, which results in a positive pulse on lead 508, the trailing edge of which triggers one-shot multivibrator circuit 510 to cause the 2250 hertz signal to be transmitted over leads 304 for 34.4 milliseconds, at the end of a scan, thereby providing the RINGBACK signal to the remote transponder unit to which the central monitoring station is presently connected.

Figure 13:
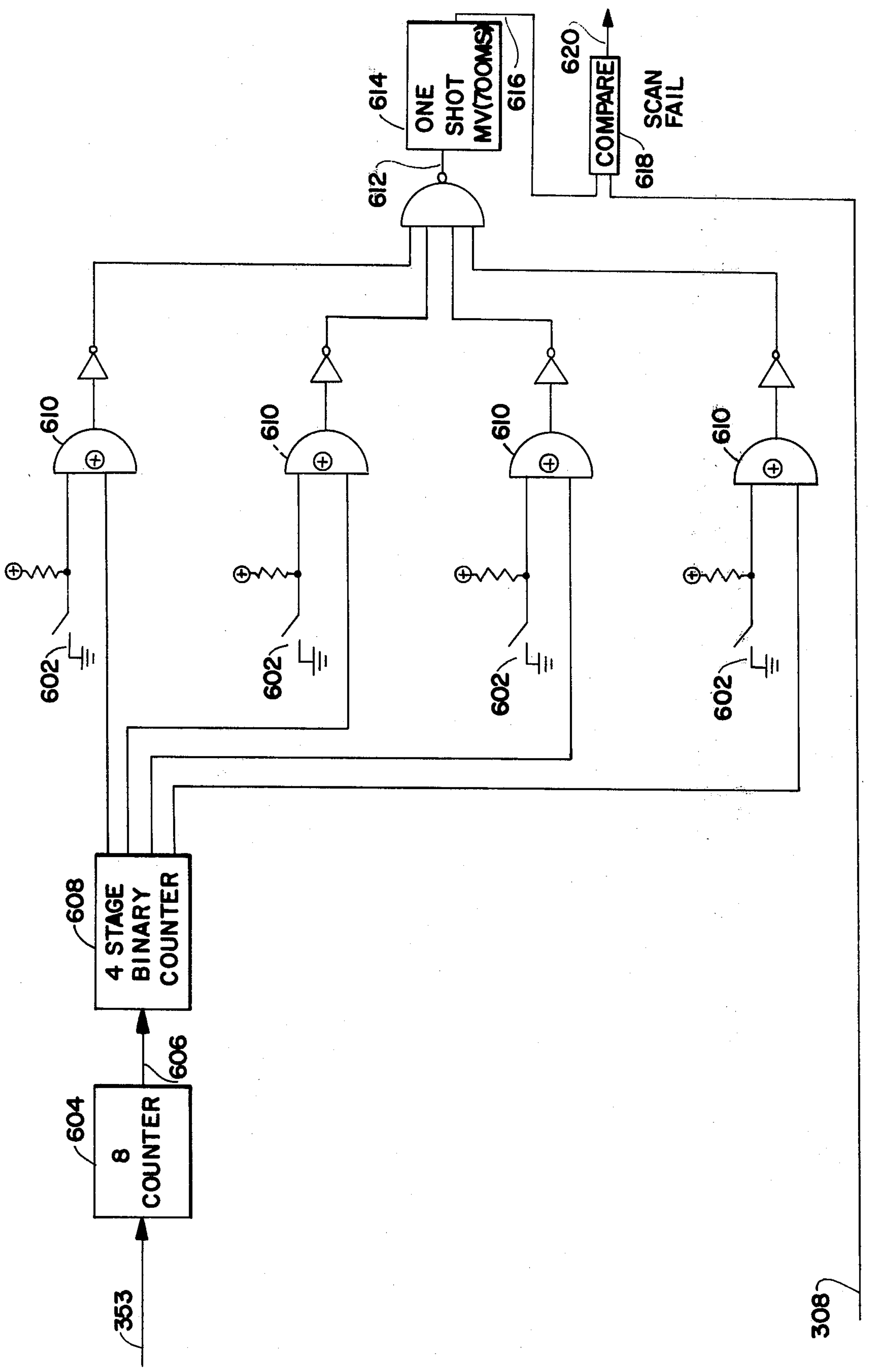
FIG. 13 is a generalized block diagram showing how the central monitoring station insures that it is synchronized with the Bell System equipment.

Referring now to FIG. 13, shown therein is the circuitry which responds to an incoming FRAME signal on lead 308 to insure that the scanning is is proceeding properly. The FRAME signal on lead 308 is generated by the Bell System equipment at the end of a complete scan of all the ports. It will be recalled that the number of ports may be incremented in groups of eight up to a total of 128 ports, that is, there are sixteen groups of eight. At the end of the scan of all the ports, the Bell System equipment provides a FRAME signal on lead 308. At the central monitoring station 50, a group of switches 602 are provided into which is set the binary equivalent of how many groups of eight ports are to be scanned. For example, if 64 ports are to be scanned, this is eight groups of eight ports. Therefore, switches 602 are set to the binary equivalent of eight (i.e. 0100). The pulse on lead 353 from system clock 358 causes eight counter 604 to be incremented. When counter 604 reaches the count of eight, a pulse is applied to lead 606 which is connected to four stage binary counter 608. The output of counter 608 provides an indication of how many groups of eight ports have been scanned. This output is compared with the setting of switches 602 by exclusive OR gates 610. When the contents of counter 608 equal the setting of switches 602, a pulse is applied to lead 612 which causes one-shot multivibrator circuit 614 to generate a 700 millisecond pulse on lead 616. Compare circuit 618 is conditioned to provide an output on lead 620 in the event that the FRAME signal on lead 308 is not received within the time interval defined by the 700 millisecond pulse on lead 616. The output on lead 620 indicates a scan fail condition, which causes central monitoring station 50 to cease updating its memories until the FRAME signal is again received.

The circuitry according to FIGS. 8A and 8B is also designed to selectively provide the status of requested accounts. For that purpose, status request switches 702 and status request switch (SR) 704 are provided. Switches 702 may illustratively be rotary decimal switches into which the desired account number may be set. When status request switch 704 is momentarily closed, address counter 349 recognizes when the account specified by status request switches 702 coincides with the account being scanned. When this occurs, the system is caused to display and print the status of the requested account. Additional circuitry, not shown, is also provided for displaying and printing the system status, i.e., the status of all accounts.

Out-of-service (OS) switch 706 is utilized when it is desired to place a particular account in an out of service condition, for example, when the transponder at that account is being repaired. Under these circumstances, the desired account number is set into switches 702 and switch 706 is momentarily closed. The system then ignores all responses from that account. The account is placed back into service by setting the account number into switches 702 and again momentarily closing switch 706.

Accordingly, there has been described an alarm system according to the principles of this invention wherein a central monitoring station is sequentially connected to poll a plurality of remote transponder units each located at a respective protected premises. Advantageously, the remote transponder units have a minimum of circuitry therein and the central monitoring station comprises all the memories and the control logic which is time shared. It is understood that the above-described arrangement is merely illustrative of the application of the principles of this invention. Numerous other arrangements may be devised by those skilled in the art without departing from the spirit and scope of this invention as defined by the appended claims. More particularly, it is expressly understood that in the appended claims, the use of the term "zone" is not intended to be limited to a physically defined area, but rather is intended broadly to mean functional zones including, for example, fire detection, day or night condition, power status, etc., as well as physically defined areas.

What is claimed is:

1. An alarm system for monitoring conditions at a plurality of protected premises comprising:

switching means having a primary port and a plurality of secondary ports and responsive to successive appearances of a predetermined signal at its primary port for sequentially establishing connections between said primary port and each of said plurality of secondary ports;

central monitoring station apparatus connected to said switching means primary port, said central monitoring station apparatus including:

means for successively generating said predetermined signal at equally spaced predetermined intervals;

means operative at the termination of each occurrence of said predetermined signal for transmitting a START signal over the connection established by said switching means;

means for detecting predetermined tones received over said connection after the termination of said START signal; and means responsive to a tone absence for recognizing an alarm condition; and a plurality of transponder units each located at a respective protected premises and each connected to a respective one of said switching means secondary ports, said respective protected premises including a plurality of protected zones, with one or more sensor elements disposed at each of said protected zones for providing status indications of each of said protected zones, each of said transponder units including:

clock means responsive to receipt of said START signal over said switching means connection for defining a plurality of time slots each corresponding to one of said protected zones;

means for transmitting selected ones of said predetermined tones during corresponding ones of said plurality of time slots over said connection; and means responsive to an indication from a sensor element of said alarm condition in one of said protected zones for inhibiting the transmission of tons in the time slot corresponding to said one protected zone, so as to produce said tone absence for recognition by said recognizing means in said central monitoring station apparatus.

2. The alarm system according to claim 1 wherein said inhibiting means includes:

a plurality of zone latches, each of said zone latches being associated with one of said protected zones, each of said zone latches normally being in a first state and settable to a second state;

means connecting the sensor element for a protected zone into a loop which is normally conditioned in one of two states, said two states being an open state and a closed state, said sensor element being responsive to said alarm condition to change the state of that loop;

means responsive to said change of state of a loop for setting the corresponding zone latch to its second state; and means coupling each of said zone latches to said transmitting means so as to enable said transmitting means during the time slot corresponding to said each protected zone when said each zone latch is in its first state and inhibit said transmitting means during the time slot corresponding to said each protected zone when said each zone latch is in its second state.

3. The alarm system according to claim 2 wherein each of said zone latches has associated therewith a respective counter, said respective counter being enabled when its corresponding zone latch is in its second state to internally count the number of START signals received, said counter being adapted to provide an output signal at a predetermined internal count, and means responsive to said counter output signal for setting the corresponding zone latch to its first state.

4. The alarm system according to claim 2 wherein a particular one of said protected zones has two sensor loops associated therewith, one of said sensor loops being continually monitored and the other of said sensor loops being monitored only during a defined period, said transponder unit further including:

switch means selectively operable into a first state to define said defined period and selectively operable into a second state at times other than during said defined period;

time latch means responsive to the state of said switch means, said time latch means being in a first state during said defined period and in a second state during times other than during said defined period; and means responsive to the state of said time latch means for coupling said one and said other sensor loops to said particular protected zone latch when said time latch means is in its first state and coupling only said one sensor loop to said particular protected zone latch when said time latch means is in its second state.

5. The alarm system according to claim 4 wherein said transponder unit further includes means responsive to an alarm condition on either said one or said other sensor loop for preventing said time latch means from switching from its second state to its first state when said switch means is switched from its second state to its first state.

6. The alarm system according to claim 5 wherein a particular one of said plurality of time slots corresponds to the state of said time latch means, said central monitoring station apparatus further including means responsive to receipt of tones in said particular time slot indicating that said time latch means has changed from its second to its first state for generating a RINGBACK signal and transmitting said RINGBACK signal over said connection, said transponder unit further including means responsive to receipt of said RINGBACK signal for providing an indication thereof.

7. The alarm system according to claim 6 wherein said RINGBACK signal has the same characteristics as said START signal but is generated at a different time.

8. The alarm system according to claim 2 wherein said transponder unit includes means responsive to the application of power to said transponder unit for setting a predetermined one of said zone latches in its second state and transmitting a unique tone in the time slot corresponding to said predetermined zone latch.

9. The alarm system according to claim 2 wherein each protected zone is assigned a predetermined tone-pair to be transmitted in its respective time slot, said transmitting means including:

tone generating means having a first group of input terminals, a second group of input terminals, a first output terminal and a second output terminal, said tone generating means being responsive to a first input signal on one of said first group of input terminals and a second input signal on one of said second group of input terminals for providing one of a first group of tones on said first output terminal and one of a second group of tones on said second output terminal; and decoding gate means having output terminals coupled to selected ones of said tone generating means first and second groups of input terminals and having input means coupled to said clock means and said zone latches, so that when a particular zone latch is in its first state said first and second input signals are presented to said tone generating means during the time slot corresponding to the particular protected zone so as to cause said tone generating means to generate a particular tone-pair during that time slot, and when said particular zone latch is in its second state said first and second input signals are not presented to said tone generating means during the time slot corresponding to the particular protected zone so as to inhibit said tone generating means from generating said particular tone-pair during that time slot.

10. The alarm system according to claim 1 wherein:

said detecting means includes a plurality of output terminals, each of said output terminals corresponding respectively to one of said predetermined tones, said detecting means being responsive to receipt of one of said predetermined tones for providing a signal on the corresponding one of said plurality of output terminals; and said recognizing means includes a plurality of present look latches each corresponding to a respective one of said protected zones, and circuitry coupling said plurality of output terminals of said detecting means to a decoder means, said decoder means being responsive to said detecting means output signals for selectively setting said present look latches into a first state when the corresponding predetermined tone is detected by said detecting means.

11. The alarm system according to claim 10 wherein said recognizing means further includes for each present look latch a last look memory and a first look memory, the outputs of said present look latch, said last look memory and said first look memory being coupled to the inputs of an adder means, said adder means providing an output signal corresponding to two or more logical ONE signals at its input, said present look latch output signal being a logical ONE when in its first state, and means for gating the state of the present look latch into the last look memory and the state of the last look memory into the first look memory.

12. The alarm system according to claim 11 wherein said recognizing means further includes a last state memory and comparing means for comparing the output of the adder means with the contents of the last state memory to provide an indication of a change of condition at the protected zone when the contents of the last state memory are different from the output of said adder means and wherein said gating means gates the output of the adder means into the last state memory.

13. The alarm system according to claim 12 wherein said central monitoring station apparatus further includes:
a printer;
printer buffer memory means for storing information to be printed by said printer; and
means responsive to said adder means output signal for storing information indicative of said alarm condition in said printer buffer memory means for printing by said printer.

14. The alarm system according to claim 12 wherein said central monitoring station apparatus further includes:
a display unit;
display buffer memory means for storing information to be displayed by said display unit;
a display write counter;
a display read counter;
means responsive to said adder means output signal for incrementing the count in said display write counter and thereafter storing in said display buffer memory means at the address corresponding to the contents of said display write counter information indicative of said alarm condition;
means comparing the contents of said display write counter and said display read counter and responsive to a difference therebetween for generating an information present signal;
means responsive to said information present signal for providing an alarm indication;
an acknowledge switch; and
means responsive to the closure of said acknowledge switch for terminating said alarm indication, incrementing said display read counter, and thereafter causing said display unit to display the contents of said display buffer memory means at the address corresponding to said display read counter contents.

15. In an alarm system for monitoring conditions at a plurality of protected premises, which alarm system includes switching means having a primary port and a plurality of secondary ports and responsive to successive appearances of a predetermined signal at its primary port for sequentially establishing connections between said primary port and each of said plurality of secondary ports, and central monitoring station apparatus connected to said switching means primary port, said central monitoring station apparatus successively generating said predetermined signal at equally spaced intervals and transmitting a START signal over the connection established by said switching means,
a transponder unit located at a respective protected premises and connected to a respective one of said switching means secondary ports, said respective protected premises including a plurality of protected zones, with one or more sensor elements disposed at each of said protected zones for providing status indications of each of said protected zones, said transponder unit including:
clock means responsive to receipt of said START signal over said switching means connection for defining a plurality of time slots each corresponding to one of said protected zones;
means for transmitting selected ones of said predetermined tones during corresponding ones of said plurality of time slots over said connection; and
means responsive to an indication from a sensor element of said alarm condition in one of said protected zones for inhibiting the transmission of tones in the time slot corresponding to said one protected zone.

16. In the alarm system according to claim 15, said inhibiting means including:
a plurality of zone latches, each of said zone latches being associated with one of said protected zones, each of said zone latches normally being in a first state and settable to a second state;
means connecting the sensor element for a protected zone into a loop which is normally conditioned in one of two states, said two states being an open state and a closed state, said sensor element being responsive to said alarm condition to change the state of that loop;
means responsive to the opening of a loop for setting the corresponding zone latch to its second state; and
means coupling each of said zone latches to said transmitting means so as to enable said transmitting means during the time slot corresponding to said each protected zone when said each zone latch is in its first state and inhibit said transmitting means during the time slot corresponding to said each protected zone when said each zone latch is in its second state.

17. In the alarm system according to claim 16, each of said zone latches having associated therewith a respective counter, said respective counter being enabled when its corresponding zone latch is in its second state to internally count the number of START signals received, said counter being adapted to provide an output signal at a predetermined internal count, and means responsive to said counter output signal for setting the corresponding zone latch to its first state.

18. In the alarm system according to claim 16 wherein a particular one of said protected zones has two sensor loops associated therewith, one of said sensor loops being continually monitored and the other of said sensor loops being monitored only during a defined period, said transponder unit further including:
switch means selectively operable into a first state to define said defined period and selectively operable into a second state at times other than during said defined period;
time latch means responsive to the state of said switch means, said time latch means being in a first state during said defined period and in a second state during times other than during said defined period; and
means responsive to the state of said time latch means for coupling said one and said other sensor loops to said particular protected zone latch when said time latch means is in its first state and coupling only said one sensor loop to said particular protected zone latch when said time latch means is in its second state.

19. In the alarm system according to claim 18, said transponder unit further including means responsive to an alarm condition on either said one or said other sensor loop for preventing said time latch means from switching from its second state to its first state when said switch means is switched from its second state to its first state.

20. In the alarm system according to claim 19 wherein a particular one of said plurality of time slots corresponds to the state of said time latch means and said central monitoring station apparatus further includes means responsive to receipt of tones in said particular time slot indicating that said time latch means has changed from its second to its first state for generating a RINGBACK signal and transmitting said RINGBACK signal over said connection, said transponder unit further including means responsive to receipt of said RINGBACK signal for providing an indication thereof.

21. In the alarm system according to claim 16, said transponder unit further including means responsive to the application of power to said transponder unit for setting a predetermined one of said zone latches in its second state and transmitting a unique tone in the time slot corresponding to said predetermined zone latch.

22. In the alarm system according to claim 16 wherein each protected zone is assigned a predetermined tone-pair to be transmitted in its respective time slot, said transmitting means including:

tone generating means having a first group of input terminals, a second group of input terminals, a first output terminal and a second output terminal, said tone generating means being responsive to a first input signal on one of said first group of input terminals and a second input signal on one of said second group of input terminals for providing one of a first group of tones on said first output terminal and one of a second group of tones on said second output terminal; and decoding gate means having output terminals coupled to selected ones of said tone generating means first and second groups of input terminals and having input means coupled to said clock means and said zone latches, so that when a particular zone latch is in its first state said first and second input signals are presented to said tone generating means during the time slot corresponding to the particular protected zone so as to cause said tone generating means to generate a particular tone-pair during that time slot, and when said particular zone latch is in its second state said first and second input signals are not presented to said tone generating means during the time slot corresponding to the particular protected zone so as to inhibit said tone generating means from generating said particular tone-pair during that time slot.

23. In an alarm system for monitoring conditions at a plurality of protected premises, which alarm system includes switching means having a primary port and a plurality of secondary ports and responsive to successive appearances of a predetermined signal at its primary port for sequentially establishing connections between said primary port and each of said plurality of secondary ports, and a plurality of transponder units each located at a respective protected premises and connected to a respective one of said switching means secondary ports, each of said transponder units being responsive to receipt of a START signal at its respective switching means secondary port for selectively transmitting predetermined tones in predetermined time slots to said switching means secondary port, central monitoring station apparatus connected to said switching means primary port, said central monitoring station apparatus including:

means for successively generating said predetermined signal at equally spaced predetermined intervals;

means operative at the termination of each occurrence of said predetermined signal for transmitting said START signal over the connection established by said switching means;

means for detecting said predetermined tones in predetermined time slots received over said connection after the termination of said START signal; and means responsive to a tone absence for recognizing an alarm condition.

24. In the alarm system according to claim 23:

said detecting means including a plurality of output terminals, each of said output terminals corresponding respectively to one of said predetermined tones, said detecting means being responsive to receipt of one of said predetermined tones for providing a signal on the corresponding one of said plurality of output terminals; and said recognizing means including a plurality of present look latches each corresponding to a respective one of said protected zones, and circuitry coupling said plurality of output terminals of said detecting means to a decoder means, said decoder means being responsive to said detecting means output signals for selectively setting said present look latches into a first state when the corresponding predetermined tone is detected by said detecting means.

25. In the alarm system according to claim 24, said recognizing means further including for each present look latch a last look memory and a first look memory, the outputs of said present look latch, said last look memory and said first look memory being coupled to the inputs of an adder means, said adder means providing an output signal corresponding to two or more logical ONE signals at its input, said present look latch output signal being a logical ONE when in its first state, and means for gating the state of the present look latch into the last look memory and the state of the last look memory into the first look memory.

26. In the alarm system according to claim 25, said recognizing means further including a last state memory and comparing means for comparing the output of the adder means with the contents of the last state memory to provide an indication of a change of condition at the protected zone when the contents of the last state memory are different from the output of said adder means and wherein said gating means gates the output of the adder means into the last state memory.

27. In the alarm system according to claim 26, said central monitoring station apparatus further including:

a printer;

printer buffer memory means for storing information to be printed by said printer; and means responsive to said adder means output signal for storing information indicative of said alarm condition in said printer buffer memory means for printing by said printer.

28. In the alarm system according to claim 26, said central monitoring station apparatus further including:

a display unit;

display buffer memory means for storing information to be displayed by said display unit;

a display write counter;

a display read counter;

means responsive to said adder means output signal for incrementing the count in said display write counter and thereafter storing in said display buffer memory means at the address corresponding to the contents of said display write counter information indicative of said alarm condition;

means comparing the contents of said display write counter and said display read counter and responsive to a difference therebetween for generating an information present signal;

means responsive to said information present signal for providing an alarm indication;

an acknowledge switch; and means responsive to the closure of said acknowledge switch for terminating said alarm indication, incrementing said display read counter, and thereafter causing said display unit to display the contents of said display buffer memory means at the address corresponding to said display read counter contents.

* * * * *